United States Patent
Liu et al.

(10) Patent No.: US 12,355,535 B2
(45) Date of Patent: Jul. 8, 2025

(54) CHANNEL STATE INFORMATION REPORTING METHOD, RECEIVING METHOD, TERMINAL, AND NETWORK SIDE DEVICE

(71) Applicant: DATANG MOBILE COMMUNICATIONS EQUIPMENT CO., LTD., Beijing (CN)

(72) Inventors: Zhengxuan Liu, Beijing (CN); Hui Li, Beijing (CN); Qiubin Gao, Beijing (CN); Runhua Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 561 days.

(21) Appl. No.: 17/427,863

(22) PCT Filed: Jan. 14, 2020

(86) PCT No.: PCT/CN2020/071916
§ 371 (c)(1),
(2) Date: Aug. 2, 2021

(87) PCT Pub. No.: WO2020/156136
PCT Pub. Date: Aug. 6, 2020

(65) Prior Publication Data
US 2022/0116093 A1    Apr. 14, 2022

(30) Foreign Application Priority Data

Feb. 3, 2019 (CN) .......................... 201910108685.4
Feb. 19, 2019 (CN) .......................... 201910124949.5

(51) Int. Cl.
*H04B 7/06* (2006.01)

(52) U.S. Cl.
CPC ......... *H04B 7/0639* (2013.01); *H04B 7/0626* (2013.01)

(58) Field of Classification Search
CPC .. H04B 7/0478; H04B 7/0626; H04B 7/0639; H04B 7/0417; H04B 7/0456
See application file for complete search history.

(56) References Cited

U.S. PATENT DOCUMENTS

| | | | |
|---|---|---|---|
| 2016/0072562 | A1 | 3/2016 | Onggosanusi et al. |
| 2017/0250712 | A1 | 8/2017 | Chiu et al. |

(Continued)

FOREIGN PATENT DOCUMENTS

| | | |
|---|---|---|
| CN | 103001676 A | 3/2013 |
| CN | 104811231 A | 7/2015 |

(Continued)

OTHER PUBLICATIONS

Samsung, "Summary of CSI enhancement for MU-MIMO support", R1-1813002, 3GPP TSG RAN WG1 Meeting #95, Spokane, USA, Nov. 12-16, 2018, all pages.

(Continued)

*Primary Examiner* — Zhensheng Zhang
(74) *Attorney, Agent, or Firm* — Ladas & Parry, LLP

(57) ABSTRACT

The present disclosure provides a channel state information reporting method, a channel state information receiving method, a terminal, and a network side device. The reporting method includes: receiving codebook parameter information sent by a network side device; determining an enhanced Type II codebook structure according to the codebook parameter information; determining non-zero coefficient indication information according to the enhanced Type II codebook structure, the non-zero coefficient indication information is used to indicate non-zero coefficient related information in a combined coefficient matrix in the (Continued)

enhanced Type II codebook structure; sending the non-zero coefficient indication information to the network side device.

10 Claims, 3 Drawing Sheets

(56) References Cited

U.S. PATENT DOCUMENTS

| | | | |
|---|---|---|---|
| 2018/0262253 | A1 | 9/2018 | Rahman et al. |
| 2018/0323854 | A1* | 11/2018 | Yang .................. H04L 25/0226 |
| 2019/0341979 | A1 | 11/2019 | Gao et al. |
| 2020/0220603 | A1* | 7/2020 | Hao .................... H04B 7/0695 |

FOREIGN PATENT DOCUMENTS

| | | |
|---|---|---|
| CN | 105406911 A | 3/2016 |
| CN | 107888323 A | 4/2018 |
| CN | 109219935 A | 1/2019 |

OTHER PUBLICATIONS

Huawei, HiSilicon, "Discussion on CSI enhancement", R1-1900016, 3GPP TSG RAN WGI Ad-Hoc Meeting 1901, Taipei, Jan. 21-25, 2019, all pages.
International Search Report from PCT/CN2020/071916, dated Mar. 12, 2020, with English translation from WIPO, all pages.
Written Opinion of the International Searching Authority from PCT/CN2020/071916, dated Mar. 12, 2020, with English translation from WIPO, all pages.
International Preliminary Report on Patentability from PCT/CN2020/071916, dated Jul. 27, 2021, with English translation from WIPO, all pages.
First Office Action and search report from CN app. No. 201910124949.5, dated Mar. 23, 2021, with English translation from Global Dossier, all pages.
NTT Docomo, "Remaining Issues on CSI reporting", R1-1720802, 3GPP TSG RAN WG1 Meeting 91, Reno, USA, Nov. 27-Dec. 1, 2017, all pages.
First Korean Office Action for Korean Patent Application 10-2021-7026241 issued on Jan. 10, 2023, and its English Translation provided by the Korean Patent Office.
"Summary of CSI enhancement for MU-MIMO," 3GPP TSG RAN WG1 Ad-Hoc Meeting 1901, R1-1901075, Agenda Item: 7.2.8.1, Source: Samsung, Taipei, Taiwan, Jan. 21-25, 2019, all pages.
Supplementary European Search Report for European Patent Application 20748199.5 issued on Mar. 7, 2022.
"On CSI enhancements for MU-MIMO," 3GPP TSG RAN WD1 Meeting Ad-Hoc Meeting 1901, R1-1900757, Taipei, Taiwan, Jan. 21-25, 2019, Source: Ericsson, Agenda Item: 7.2.8.1.
"Enhancements on Type-II CSI reporting," 3GPP TSG-RAN WG1 AH-1019, R1-1901305, Taipei, Taiwan, Jan. 21-25, 2019, Source: Fraunhofer IIS, Fraunhofer HHI, Agenda Item: 7.2.8.1.
Office action from corresponding Korean Patent Application No. 10-2023-7044754 dated Feb. 20, 2024, and its English translation.
Samsung, R1-1901276, CSI enhancement for MU-MIMO, 3GPP TSG RAN WG1 #AH, 3GPP server publication date (Jan. 17, 2019), Taipei, Taiwan.

* cited by examiner

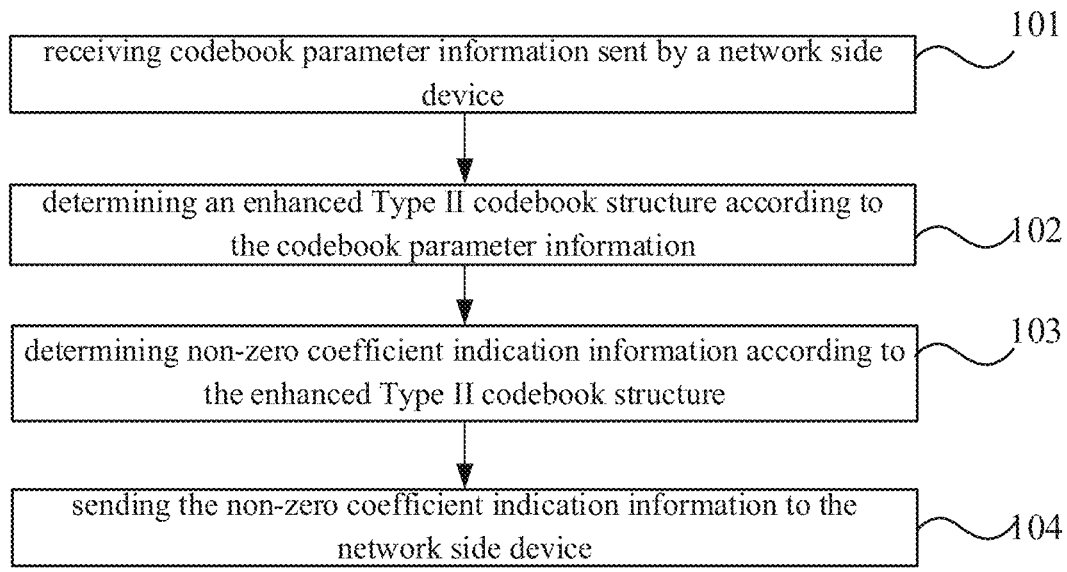
FIG. 1
FIG. 2
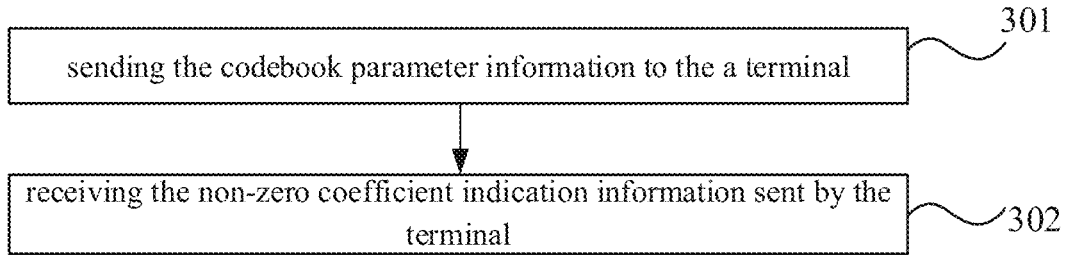
FIG. 3

CHANNEL STATE INFORMATION REPORTING METHOD, RECEIVING METHOD, TERMINAL, AND NETWORK SIDE DEVICE

CROSS-REFERENCE TO RELATED APPLICATIONS

This application is the U.S. national phase of PCT Application No. PCT/CN2020/071916 filed on Jan. 14, 2020, which claims a priority of the Chinese patent application No. 201910108685.4 filed on Feb. 3, 2019, and a priority of the Chinese patent application No. 201910124949.5 filed on Feb. 19, 2019, the disclosures of which are incorporated herein by reference in their entireties.

TECHNICAL FIELD

The present disclosure relates to the field of communication technology, in particular to a channel state information reporting method, a channel state information receiving method, a terminal, and a network side device.

BACKGROUND

The Type II codebook is defined in the New Radio (NR) system. The Type II codebook in Rel-15 is based on the linear combination of orthogonal beams and has high channel quantization accuracy, but the feedback overhead is large. Rel-16 proposes a low-overhead Type II codebook (that is, an enhanced Type II codebook structure), which is based on a linear combination of orthogonal beams and subband coefficient compression method.

Among them, the Type II codebook defined in NR Rel-15 supports Rank1 and Rank2 codebooks.

For a subband, the Rank1 codebook is represented as:

$$W = \begin{bmatrix} \tilde{w}_{0,0} \\ \tilde{w}_{1,0} \end{bmatrix}$$

The Rank2 codebook is represented as $$W = \begin{bmatrix} \tilde{w}_{0,0} & \tilde{w}_{0,1} \\ \tilde{w}_{1,0} & \tilde{w}_{1,1} \end{bmatrix}$$

Among them, $$\tilde{w}_{r,l} = \sum_{i=0}^{L-1} b_{k_1^{(i)} k_2^{(i)}} \cdot p_{r,l,i}^{(WB)} \cdot p_{r,l,i}^{(SB)} \cdot c_{r,l,i}$$

L represents a quantity of orthogonal beams in a group, $b_{k_1,k_2}$ represents the orthogonal beam, which uses a two-dimensional Discrete Fourier Transformation (2D DFT) vector, r=0, 1 represents a first polarization direction and a second polarization direction in a dual-polarized antenna array, l=0, 1 represents the layer. $p_{r,l,i}^{(WB)}$ represents the broadband amplitude coefficient acting on beam i, polarization direction r and layer l in the beam group; $p_{r,l,i}^{(SB)}$ represents a subband amplitude coefficient acting on beam i, polarization direction r and layer l in the beam group; $c_{r,l,i}$ represents a subband phase coefficient acting on beam i, polarization direction r and layer l in the beam group. Since the quantity of codebook coefficients with Rank=2 is about twice the quantity of codebook coefficients with Rank=1, the codebook overhead varies greatly when the value of the Rank Indication (RI) is different. Since the base station receives the Channel State Information (CSI) fed back by the terminal, the value of the RI cannot be known before the correct decoding, and therefore the CSI overhead cannot be determined. In order to prevent the base station from being unable to correctly decode CSI due to ambiguity in overhead, in Rel-15, the following two-part structure is adopted for Type II CSI reporting:

The first part of the CSI includes RI, the wideband Channel Quality Indicator (CQI) corresponding to the first codeword, the differential CQI corresponding to the first codeword, the quantity of zero coefficients in layer one, and the quantity of the zero coefficients in layer two. The second part of the CSI includes rotation factor, beam indicator information, the strongest beam indicator of layer one, the broadband amplitude coefficient of layer one, the strongest beam indicator of layer two, the broadband amplitude coefficient of layer two, the subband phase, and/or subband amplitude coefficient of the even-numbered subband, and the subband phase and/or subband amplitude coefficient of the odd-numbered subband.

Among them, the overhead of the first part of the CSI is fixed and is irrelevant to the value of the RI, and the overhead of the second part of the CSI can be determined by the decoded result of the first part. Therefore, the problem of overhead ambiguity is avoided.

Since the feedback of each subband includes both the subband phase coefficient and the sub-band amplitude coefficient, when the quantity of subbands is large, the feedback overhead required to feedback the coefficients of all the sub-bands is huge. For this reason, a low-overhead Type II codebook is defined in NR Rel-16, which compresses the coefficients of each subband. Taking Rank=1 as an example, for all subbands, the codebook can be represented as:

$$W = W_1 \tilde{W}_2 W_f^H = \begin{bmatrix} b_{k_1^{(0)} k_2^{(0)}} & b_{k_1^{(1)} k_2^{(1)}} & L & b_{k_1^{(L-1)} k_2^{(L-1)}} & 0 \\ 0 & & & & b_{k_1^{(0)} k_2^{(0)}} & b_{k_1^{(1)} k_2^{(1)}} & L & b_{k_1^{(L-1)} k_2^{(L-1)}} \end{bmatrix}.$$

$$\begin{bmatrix} p_{0,0} \cdot c_{0,0} & p_{0,1} \cdot c_{0,1} & L & p_{0,M-1} \cdot c_{0,M-1} \\ p_{1,0} \cdot c_{1,0} & p_{1,1} \cdot c_{1,1} & L & p_{1,M-1} \cdot c_{1,M-1} \\ M & & & M \\ p_{2L-1,0} \cdot c_{2L-1,0} & p_{2L-1,1} \cdot c_{2L-1,1} & L & p_{2L-1,M-1} \cdot c_{2L-1,M-1} \end{bmatrix}.$$

-continued $$\begin{bmatrix} f_{0,0} & f_{0,1} & L & f_{0,N-1} \\ f_{1,0} & f_{1,1} & L & f_{1,N-1} \\ M & & & M \\ f_{M-1,0} & f_{M-1,1} & L & f_{M-1,N-1} \end{bmatrix}$$

Among them, the orthogonal combined beam contained in $W_1$ is the same as the Type II codebook of Rel-15; $\tilde{W}_2$ represents the compressed coefficient (that is, combined coefficient matrix), where $p_{i,j}$ represents the amplitude coefficient and $c_{i,j}$ represents the phase coefficient; $W_f$ represents the compressed base vector, which contains M base vectors, the length of each vector is N, and N is determined by the quantity of subbands. Among them, the compressed coefficients in $\tilde{W}_2$ need to be quantized and fed back to the base station. However, there is no corresponding CSI feedback method for the codebook structure of Rel-16.

SUMMARY

The present disclosure provides a channel state reporting method, a receiving method, a terminal and a network side device, so as to realize CSI feedback for the codebook structure of Rel-16.

An embodiment of the present disclosure provides a channel state reporting method, including: receiving codebook parameter information sent by a network side device; determining an enhanced Type II codebook structure according to the codebook parameter information; determining non-zero coefficient indication information according to the enhanced Type II codebook structure, wherein the non-zero coefficient indication information is used to indicate non-zero coefficient related information in a combined coefficient matrix in the enhanced Type II codebook structure; sending the non-zero coefficient indication information to the network side device.

An embodiment of the present disclosure also provides a channel state information receiving method, including: sending codebook parameter information to a terminal; receiving the non-zero coefficient indication information sent by the terminal, wherein the non-zero coefficient indication information is used to indicate the non-zero coefficient related information of a combined coefficient matrix in the enhanced Type II codebook structure, the enhanced Type II codebook structure is determined by the terminal according to the codebook parameter information.

An embodiment of the present disclosure also provides a terminal, including: a first receiving module, configured to receive codebook parameter information sent by a network side device; a codebook structure determination module, configured to determine an enhanced Type II codebook structure according to the codebook parameter information; an indication information determination module, configured to determine non-zero coefficient indication information according to the enhanced Type II codebook structure, wherein the non-zero coefficient indication information is used to indicate non-zero coefficient related information in a combined coefficient matrix in the enhanced Type II codebook structure; a first sending module, configured to send the non-zero coefficient indication information to the network side device.

An embodiment of the present disclosure also provides a network side device, including: a second sending module, configured to send codebook parameter information to a terminal; a second receiving module, configured to receive non-zero coefficient indication information sent by the terminal, wherein the non-zero coefficient indication information is used to indicate the relevant information of the non-zero coefficients in a combined coefficient matrix in an enhanced Type II codebook structure, the enhanced Type II codebook structure is determined according to the codebook parameter information.

An embodiment of the present disclosure also provides a terminal, including: a first transceiver, a first memory, a first processor; and programs which are stored on the first memory and executed by the first processor; wherein: the first transceiver is used to: receive codebook parameter information sent by a network side device; the first processor is used to: determine an enhanced Type II codebook structure according to the codebook parameter information; determine non-zero coefficient indication information according to the enhanced Type II codebook structure, wherein the non-zero coefficient indication information is used to indicate non-zero coefficient related information in a combined coefficient matrix in the enhanced Type II codebook structure; the first transceiver is further used to: send the non-zero coefficient indication information to the network side device.

An embodiment of the present disclosure also provides a network side device, which includes a second transceiver, a second memory, a second processor, and a program stored on the second memory and executed by the second processor; the second transceiver is used to: send codebook parameter information to a terminal; receive non-zero coefficient indication information sent by the terminal, wherein the non-zero coefficient indication information is used to indicate the non-zero coefficient related information of a combined coefficient matrix in an enhanced Type II codebook structure, the enhanced Type II codebook structure is determined according to the codebook parameter information.

An embodiment of the present disclosure also provides a computer-readable storage medium on which a computer program is stored, when executed by a processor, the computer program implements the steps of the channel state information reporting method, and the steps of the channel state information receiving method.

The beneficial effects of the embodiments of the present disclosure are:

In the embodiment of the present disclosure, the terminal can determine the enhanced Type II codebook structure according to the received codebook parameter information sent by the network side device, and thereby determining the non-zero coefficient indication information (which is used to indicate the non-zero coefficient related information of the combined coefficient matrix in the enhanced Type II codebook structure) according to the enhanced Type II codebook structure, and thereby sending the non-zero coefficient indication information to the network side device, and realizing CSI feedback for the codebook structure of Rel-16.

BRIEF DESCRIPTION OF THE DRAWINGS

FIG. 1 illustrates a flowchart of a channel state information reporting method according to a first embodiment of the present disclosure;

FIG. 2 illustrates a schematic diagram showing positions of a first beam set and a first basis vector set in the first embodiment of the present disclosure;

FIG. 3 illustrates a flowchart of a channel state information receiving method according to a second embodiment of the present disclosure;

DETAILED DESCRIPTION

Figure 4:
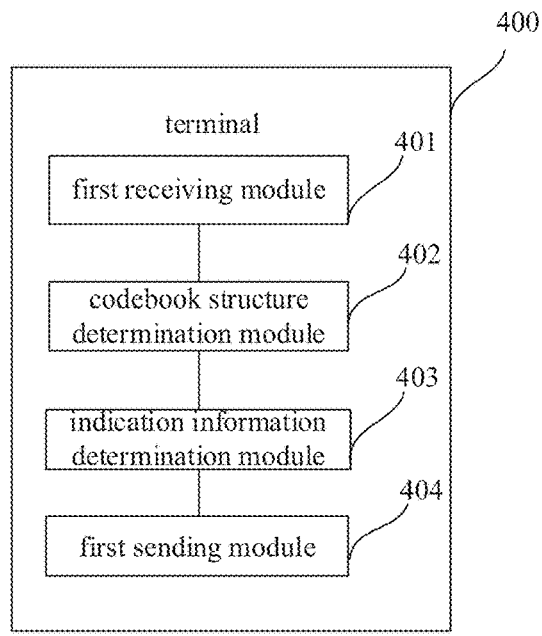
FIG. 4 illustrates a schematic module diagram of a terminal according to a third embodiment of the present disclosure.

In order to make the technical problem to be solved, the technical solutions and advantages of the present disclosure clearer, the present disclosure will be described in detail below with reference to the drawings and specific embodiments. In the following description, specific details such as specific configurations and specific details of components are provided only to help a comprehensive understanding of the embodiments of the present disclosure. Therefore, it should be clear to those skilled in the art that various changes and modifications can be made to the embodiments described herein without departing from the scope and spirit of the present disclosure. In addition, for clarity and conciseness, descriptions of known functions and configurations are omitted.

It should be understood that "one embodiment" or "an embodiment" mentioned throughout the present disclosure means that a specific feature, structure, or characteristic related to the embodiment is included in at least one embodiment of the present disclosure. Therefore, "in one embodiment" or "in an embodiment" in various places throughout the present disclosure do not necessarily refer to the same embodiment. In addition, these specific features, structures, or characteristics can be combined in one or more embodiments in any suitable manner.

In the various embodiments of the present disclosure, it should be understood that the size of the sequence number of the following processes does not mean the order of execution. The execution order of each process should be determined by its function and internal logic, and should not constitute any limitation to the implementation process of the embodiments of the present disclosure.

In addition, the terms "system" and "network" in the present disclosure are often used interchangeably in the present disclosure.

In the embodiments provided in the present disclosure, it should be understood that "B corresponding to A" means that B is associated with A, and B can be determined according to A. However, it should also be understood that determining B according to A does not mean that B is determined only according to A, and B can also be determined according to A and/or other information.

In the embodiments of the present disclosure, the form of the access network is not limited, and may include Macro Base Station, Pico Base Station, Node B (the name of the 3G mobile base station), Evolved Node B (eNB), Femto eNB or Home eNode B or Home eNB or HeNB, Relay Station, Access Point, Remote Radio Unit (RRU), Remote Radio Head (RRH) and etc. The user terminal can be a mobile phone (or cell phone), or other equipment capable of sending or receiving wireless signals, including user equipment, Personal Digital Assistant (PDA), wireless modem, wireless communication device, handheld device, laptop, cordless phone, Wireless Local Loop (WLL) station, Customer Premise Equipment (CPE) that can convert mobile signals into wireless fidelity (WIFI) signals, or mobile smart hotspot, smart home appliance, or other devices that can spontaneously communicate with the mobile communication network without human operation.

The embodiments of the present disclosure provide a channel state information reporting method, a channel state information receiving method, a terminal, and a network side device; and realize CSI feedback for the codebook structure of Rel-16.

The First Embodiment

As shown in FIG. 1, an embodiment of the present disclosure provides a channel state information reporting method, which specifically includes the following steps:

Step 101: receiving codebook parameter information sent by a network side.

The channel state information reporting method in the embodiments of the present disclosure is applicable to the enhanced Type II codebook structure (that is, the low-overhead Type II codebook structure defined in NR Rel-16), which is a method based on linear combination of orthogonal beams and subband coefficient compression. In addition, the codebook parameter information includes the quantity of beams and the quantity of base vectors.

Specifically, it is assumed that the enhanced Type II codebook structure includes two layers, each layer of the precoding matrix includes 2L beams, and the same M base vectors are used. For the Type II codebook with Rank=2, the layer one precoding is represented as:

$$W^{(0)} = W_1 \tilde{W}_{2,0} W_{f,0}^H = \begin{bmatrix} b_{k_1^{(0)} k_2^{(0)}} & b_{k_1^{(1)} k_2^{(1)}} & L & b_{k_1^{(L-1)} k_2^{(L-1)}} & & & & 0 \\ & & 0 & & & b_{k_1^{(0)} k_2^{(0)}} & b_{k_1^{(1)} k_2^{(1)}} & L & b_{k_1^{(L-1)} k_2^{(L-1)}} \end{bmatrix}.$$

$$\begin{bmatrix} p_{0,0}^{(0)} \cdot c_{0,0}^{(0)} & p_{0,1}^{(0)} \cdot c_{0,1}^{(0)} & L & p_{0,M-1}^{(0)} \cdot c_{0,M-1}^{(0)} \\ p_{1,0}^{(0)} \cdot c_{1,0}^{(0)} & p_{1,1}^{(0)} \cdot c_{1,1}^{(0)} & L & p_{1,M-1}^{(0)} \cdot c_{1,M-1}^{(0)} \\ M & & & M \\ p_{2L-1,0}^{(0)} \cdot c_{2L-1,0}^{(0)} & p_{2L-1,1}^{(0)} \cdot c_{2L-1,1}^{(0)} & L & p_{2L-1,M-1}^{(0)} \cdot c_{2L-1,M-1}^{(0)} \end{bmatrix}.$$

-continued $$\begin{bmatrix} f_{0,0}^{(0)} & f_{0,1}^{(0)} & L & f_{0,N-1}^{(0)} \\ f_{1,0}^{(0)} & f_{1,1}^{(0)} & L & f_{1,N-1}^{(0)} \\ M & & & M \\ f_{M-1,0}^{(0)} & f_{M-1,1}^{(0)} & L & f_{M-1,N-1}^{(0)} \end{bmatrix}$$

Layer two precoding is represented as:

$$W = W_1 \tilde{W}_2 W_f^H = \begin{bmatrix} b_{k_1^{(0)} k_2^{(0)}} & b_{k_1^{(1)} k_2^{(1)}} & L & b_{k_1^{(L-1)} k_2^{(L-1)}} & & & & 0 \\ & & 0 & & b_{k_1^{(0)} k_2^{(0)}} & b_{k_1^{(1)} k_2^{(1)}} & L & b_{k_1^{(L-1)} k_2^{(L-1)}} \end{bmatrix}.$$

$$\begin{bmatrix} p_{0,0}^{(1)} \cdot c_{0,0}^{(1)} & p_{0,1}^{(1)} \cdot c_{0,1}^{(1)} & L & p_{0,M-1}^{(1)} \cdot c_{0,M-1}^{(1)} \\ p_{1,0}^{(1)} \cdot c_{1,0}^{(1)} & p_{1,1}^{(1)} \cdot c_{1,1}^{(1)} & L & p_{1,M-1}^{(1)} \cdot c_{1,M-1}^{(1)} \\ M & & & M \\ p_{2L-1,0}^{(1)} \cdot c_{2L-1,0}^{(1)} & p_{2L-1,1}^{(1)} \cdot c_{2L-1,1}^{(1)} & L & p_{2L-1,M-1}^{(1)} \cdot c_{2L-1,M-1}^{(1)} \end{bmatrix}.$$

$$\begin{bmatrix} f_{0,0}^{(1)} & f_{0,1}^{(1)} & L & f_{0,N-1}^{(1)} \\ f_{1,0}^{(1)} & f_{1,1}^{(1)} & L & f_{1,N-1}^{(1)} \\ M & & & M \\ f_{M-1,0}^{(1)} & f_{M-1,1}^{(1)} & L & f_{M-1,N-1}^{(1)} \end{bmatrix}$$

Where $W_{2,0}^{\%}$ and $W_{2,1}^{\%}$ are a 2L*M-dimensional matrix.

Step 102: determining an enhanced Type II codebook structure according to the codebook parameter information.

Step 103: determining non-zero coefficient indication information according to the enhanced Type II codebook structure.

The non-zero coefficient indication information is used to indicate the non-zero coefficient related information in the combined coefficient matrix in the enhanced Type II codebook structure. The related information includes one or more of the following: the position information of non-zero coefficients in the combined coefficient matrix, beam set information and basis vector set information of the non-zero coefficients in the combined coefficient matrix, and the quantity of the non-zero coefficients. In addition, the rows of the combined coefficient matrix represent beams, and the columns thereof represent frequency domain base vectors.

Step 104: sending the non-zero coefficient indication information to the network side.

The specific content included in the non-zero coefficient indication information and the reporting method respectively include the following situations.

Situation 1:

Optionally, the non-zero coefficient indication information includes one or more of the following: position information of the non-zero coefficients of each layer in the combined coefficient matrix of each layer in the enhanced Type II codebook structure, and a quantity of the non-zero coefficients of each layer.

Optionally, the sending the non-zero coefficient indication information to the network side device includes:

if the non-zero coefficient indication information includes the position information of the non-zero coefficients of each layer in the combined coefficient matrix of each layer of the enhanced Type II codebook structure, the position information of the non-zero coefficients of each layer in the combined coefficient matrix of each layer in the enhanced Type II codebook structure being carried in a first part or a second part of the channel state information and sent to the network side device;

if the non-zero coefficient indication information includes the quantity of non-zero coefficients of each layer, the quantity of non-zero coefficients of each layer being carried in the first part of the channel state information and sent to the network side device.

One specific implementation is as follows:

Specifically, the non-zero coefficient indication information includes the position information of the non-zero coefficients of each layer in the combined coefficient matrix of each layer in the enhanced Type II codebook structure.

Specifically, the position information of the non-zero coefficients of each layer in the combined coefficient matrix of each layer may be represented in the form of a bitmap or may be represented in the form of an index set.

Specific examples are as follows:

When the low-overhead Type II codebook structure defined in NR Rel-16 includes two layers (layer one and layer two), assuming that each layer has K0 (less than 2L*M) non-zero coefficients, then each layer has K0 positions of the non-zero coefficients that need to be reported to the base station. 2L represents the quantity of beams, and M represents the quantity of base vectors.

Among them, the following reporting methods can be used:

Each layer reports a bitmap with a size of 2L*M, where a bit value of 1 indicates that the coefficient at the corresponding position is non-zero; or, each layer reports the index of each of K0 non-zero coefficients in 2L*M coefficients, the size is $$\log_2 \binom{2L*M}{K0}$$

bytes.

Correspondingly, sending the non-zero coefficient indication information to the network side includes:

the position information of the non-zero coefficients of each layer in the combined coefficient matrix of each layer in the enhanced Type II codebook structure is carried in the first part of the channel state information and sent to the network side.

In addition, another specific implementation is as follows:

Specifically, the non-zero coefficient indication information includes: the position information of the non-zero coefficients of each layer in the combined coefficient matrix of each layer in the enhanced Type II codebook structure and the quantity of the non-zero coefficients of each layer.

Correspondingly, sending the non-zero coefficient indication information to the network side includes:

the quantity of non-zero coefficients of each layer is carried in the first part of the channel state information and sent to the network side;

the position information of the non-zero coefficients of each layer in the combined coefficient matrix of each layer in the enhanced Type II codebook structure is carried in the second part of the channel state information and sent to the network side.

That is, assuming that the enhanced Type II codebook structure includes layer one and layer two, where layer one contains K1 (less than 2L*M) non-zero coefficients, and layer two contains K2 (less than 2L*M) non-zero coefficients, then the quantity of non-zero coefficients of layer one (K1) and layer two (K2) may be reported respectively in the first part of the CSI, and bitmap1 and bitmap2 indicating the position information of the non-zero coefficients may be reported respectively in the second part of the CSI.

Situation 2:

Optionally, the non-zero coefficient indication information includes one or more of the following: a first beam set and a first basis vector set where the non-zero coefficients of each layer in the enhanced Type II codebook structure are located, first indication information used to indicate positions of non-zero coefficients in the first beam set and the first basis vector set, and a quantity of non-zero coefficients of each layer.

Optionally, sending the non-zero coefficient indication information to the network side includes:

if the non-zero coefficient indication information includes the first beam set and the first basis vector set, the first beam set and the first basis vector set being carried in the first part of the channel state information and sent to the network side device;

if the non-zero coefficient indication information includes the first indication information, the first indication information being carried in the first part or the second part of the channel state information and sent to the network side device;

if the non-zero coefficient indication information includes the quantity of non-zero coefficients of each layer, the quantity of non-zero coefficients of each layer being carried in the first part of the channel state information and sent to the network side device.

One specific implementation is as follows:

Specifically, the first beam set and the first basis vector set where the non-zero coefficients of each layer of the enhanced Type II codebook structure are located, the first indication information used to indicate the positions of non-zero coefficients in the first beam set and the first basis vector set, and the quantity of non-zero coefficients in each layer.

Among them, the beam set where the non-zero coefficients are located can be defined as a "non-zero coefficient beam set", and the basis vector set where the non-zero coefficients are located can be defined as a "non-zero coefficient basis vector set". Then the first beam set is a non-zero coefficient beam set, and the first basis vector set is a non-zero coefficient basis vector set.

In addition, the non-zero coefficient beam set and the non-zero basis vector set can be indicated in a bitmap or index set.

For example, if the non-zero coefficient beam set contains 2L, the length of the bitmap is 2L. If there are K beam vectors with non-zero coefficients, then K bits are set to 1, or the index set indications containing K elements can be used, such as {2, 3, 5 . . . }, which means the beam vectors of 2, 3, 5, etc contain non-zero coefficients.

Similarly, if the basis vector set contains M, the length of the bitmap is M, where N bits are set to 1, indicating that the N base vectors contain non-zero coefficients. If the index set is used, such as {1, 2, 4 . . . }, it means that these base vectors of 1, 2, 4, etc contain non-zero coefficients.

In addition, the non-zero coefficients are constrained to the coefficient positions corresponding to the non-zero coefficient basis vector set and the non-zero coefficient beam set, and this position can be defined as a candidate coefficient position. That is, the coefficient positions corresponding to the first beam set and the first basis vector set are candidate coefficient positions. Then, the terminal may first indicate the position of the candidate coefficient, and then further indicate (bitmap or position index) which positions on the candidate coefficient positions have non-zero coefficients.

For example, for the non-zero coefficients of layer one, the non-zero coefficient basis vector set reported by the terminal includes base vector 1 and base vector M−1, and the reported non-zero coefficient beam set includes beams 1 and 2L. In this way, the candidate coefficient positions include 4L+2(M−2) positions in the box as shown in FIG. 2. In addition, the terminal further reports a bitmap of 4L+2 (M−2) bits, indicating which positions in the box shown in FIG. 2 have non-zero coefficients.

Correspondingly, sending the non-zero coefficient indication information to the network side includes:

the first beam set, the first basis vector set, and the quantity of non-zero coefficients of each layer are carried in the first part of the channel state information and sent to the network side;

the first indication information is carried in the second part of the channel state information and sent to the network side.

That is, the first beam set, the first basis vector set, the quantity of non-zero coefficients of each layer, and the first indication information are reported in different parts of the CSI, which can further reduce the signaling overhead.

From the above, it is assumed that the enhanced Type II codebook structure includes layer one and layer two, where layer one contains K1 (less than 2L*M) non-zero coefficients, and layer two contains K2 (less than 2L*M) non-zero coefficients, then the quantity of non-zero coefficients of layer one (K1) and layer two (K2) can be reported in the first part of the CSI, and a bitmap14 and bitmap15 are used to indicate the approximate positions of the non-zero coefficients of layer one and layer two, bitmap14 and bitmap15 can be determined according to the beam set and basis vector set where the non-zero coefficients are located, and then bitmap14 and bitmap15 are reported in the second part of the CSI to indicate the specific positions of non-zero coefficients of layer one and layer two.

Specifically, if the quantity of beams in each layer 2L=4 and the quantity of base vectors M=4, then the position of the non-zero coefficients of layer one is represented by bitmap1' as shown in Table 1, and the position of the non-zero coefficients of layer two is represented by Bitmap2' as shown in Table 2.

TABLE 1

| bitmap1' | | | |
|---|---|---|---|
| 1 | 0 | 1 | 1 |
| 0 | 0 | 1 | 0 |
| 1 | 1 | 0 | 1 |
| 0 | 0 | 1 | 1 |

TABLE 2

| bitmap2' | | | |
|---|---|---|---|
| 1 | 0 | 1 | 0 |
| 0 | 1 | 1 | 0 |
| 1 | 0 | 0 | 1 |
| 0 | 0 | 1 | 0 |

Specifically, for the positions of the non-zero coefficients of the two layers shown in Table 1 and Table 2 above, the quantity of non-zero coefficients of layer one and layer two that can be reported in the first part of the CSI are K1=9 and K2=7 respectively. The beam vector set where the non-zero coefficients of layer one are located is {1, 2, 3, 4} and the basis vector set is {1, 2, 3, 4}, which is represented by bitmap14 (as shown in Table 17).

TABLE 17

| bitmap14 | | | | | | | |
|---|---|---|---|---|---|---|---|
| 1 | 1 | 1 | 1 | 1 | 1 | 1 | 1 |

The beam vector set where the non-zero coefficients of layer two are located is {1, 2, 3, 4} and the basis vector set is {1, 2, 3, 4}, which is represented by bitmap15 (as shown in Table 18).

TABLE 18

| bitmap15 | | | | | | | |
|---|---|---|---|---|---|---|---|
| 1 | 1 | 1 | 1 | 1 | 1 | 1 | 1 |

Then the specific positions of non-zero coefficients of layer one and layer two are reported in the second part of the CSI, and the specific positions of non-zero coefficients of layer one is represented by bitmap16 (as shown in Table 19).

TABLE 19

| bitmap16 | | | |
|---|---|---|---|
| 1 | 0 | 1 | 1 |
| 0 | 0 | 1 | 0 |
| 1 | 1 | 0 | 1 |
| 0 | 0 | 1 | 1 |

The specific non-zero coefficient position of layer two is represented by bitmap17 (as shown in Table 20).

TABLE 20

| bitmap17 | | | |
|---|---|---|---|
| 1 | 0 | 1 | 0 |
| 0 | 1 | 1 | 0 |
| 1 | 0 | 0 | 1 |
| 0 | 0 | 1 | 0 |

Situation 3:

Optionally, the non-zero coefficient indication information includes one or more of the following: position information of non-zero coefficients of respective layers of the enhanced Type II codebook structure at a same position in combined coefficient matrix of respective layers, position information of remaining non-zero coefficients of each layer in the combined coefficient matrix of each layer, and a quantity of the remaining non-zero coefficients of each layer; wherein, the remaining non-zero coefficients are non-zero coefficients at positions other than the same position in the combined coefficient matrix.

Optionally, sending the non-zero coefficient indication information to the network side includes:
if the non-zero coefficient indication information includes the position information of non-zero coefficients at the same position, the position information of non-zero coefficients at the same position being carried in the first part of the channel state information and sent to the network side device;
if the non-zero coefficient indication information includes the position information of the remaining non-zero coefficients of each layer in the combined coefficient matrix of each layer, the position information of the remaining coefficients of each layer in the combined coefficient matrix of each layer being carried in the first part or the second part of the channel state information and sent to the network side device;
if the non-zero coefficient indication information includes the quantity of remaining non-zero coefficients of each layer, the quantity of the remaining non-zero coefficients of each layer being carried in the first part of the channel state information and sent to the network side device.

One specific implementation is as follows:

Specifically, the non-zero coefficient indication information includes: the position information of the non-zero coefficient of each layer of the enhanced Type II codebook structure at the same position in the combined coefficient matrix of each layer, the position information of the remaining non-zero coefficients of each layer in the combined coefficient matrix of each layer, and the quantity of the remaining non-zero coefficients of each layer; among them the remaining non-zero coefficients are non-zero coefficients at the positions other than the same position in the combined coefficient matrix.

Among them, the position information of the non-zero coefficients of each layer at the same position in the combined coefficient matrix of each layer can be represented by a bitmap, and a value of 1 in a bitmap indicates that a non-zero coefficient is at the position.

In addition, the position information of the remaining non-zero coefficients of each layer in the combined coefficient matrix of each layer can be represented in the form of a bitmap, or can also be represented in the form of position index. If layer one contains K1 (less than 2L*M) non-zero coefficients, and layer two contains K2 (less than 2L*M) non-zero coefficients, the quantity of non-zero coefficients of layer one and layer two at the same position is K0, then the quantity of remaining non-zero coefficients in the two layers are K1-K0 and K2-K0 respectively, and their indexes in the 2L*M coefficients can be indicated respectively by $$\log_2\binom{2L*M}{K1-K0} \text{ and } \log_2\binom{2L*M}{K2-K0}$$

bits, where 2L represents the quantity of beams, and M represents the quantity of base vectors.

In addition, when the position information of the non-zero coefficients of respective layers at the same position in the combined coefficient matrix of respective layers, and the position information of the remaining non-zero coefficients of each layer in the combined coefficient matrix of each layer, both are represented in the form of a bitmap, then the specific examples are as follows:

For example, when the low-overhead Type II codebook structure defined in NR Rel-16 includes two layers (i.e., layer one and layer two), assume that layer one contains K1 (less than 2L*M) non-zero coefficient, and layer two contains K2 (less than 2L*M) non-zero coefficients, where 2L represents the quantity of beams, and M represents the quantity of base vectors.

Among them, the same position indication of the non-zero coefficients of respective layers can be indicated by a 2L*M bitmap0, where 1 indicates that a non-zero coefficient is at the position. Let bitmap1' and bitmap2' respectively indicate the positions of the non-zero coefficients of layer one and layer two with a size of 2L*M. Then bitmap1' and bitmap2' respectively remove the non-zero coefficient positions in bitmap0, and the positions of the remaining non-zero coefficients of layer one and layer two can be obtained, and bitmap1 and bitmap2 can be used to indicate the positions of the remaining non-zero coefficients respectively.

Specifically, for the positions of the non-zero coefficients of layer one shown in Table 1 and the positions of the non-zero coefficients of layer two shown in Table 2, the non-zero coefficients of layer one and layer two at the same position can be indicated by bitmap0, as shown in Table 3.

TABLE 3

| bitmap0 | | | |
|---|---|---|---|
| 1 | 0 | 1 | 0 |
| 0 | 0 | 1 | 0 |
| 1 | 0 | 0 | 1 |
| 0 | 0 | 1 | 0 |

Among them, for layer one, let bitmap1=bitmap bitmap0, as shown in Table 4.

TABLE 4

| bitmap1 | | | |
|---|---|---|---|
| 0 | 0 | 0 | 1 |
| 0 | 0 | 0 | 0 |
| 0 | 1 | 0 | 0 |
| 0 | 0 | 0 | 1 |

Similarly, for layer two, let bitmap2=bitmap2'-bitmap0, as shown in Table 5.

TABLE 5

| bitmap2 | | | |
|---|---|---|---|
| 0 | 0 | 0 | 0 |
| 0 | 1 | 0 | 0 |
| 0 | 0 | 0 | 0 |
| 0 | 0 | 0 | 0 |

Correspondingly, sending the non-zero coefficient indication information to the network side includes:

the position information of the non-zero coefficients of respective layers of the enhanced Type II codebook structure at the same position in the combined coefficient matrix of respective layers, and the quantity of the remaining non-zero coefficients of each layer are carried in the first part of the channel state information and sent to the network side;

the position information of the remaining non-zero coefficients of each layer in the combined coefficient matrix of each layer is carried in the second part of the channel state information and sent to the network side.

In addition, the content included in the above "the position information of the remaining non-zero coefficients of each layer in the combined coefficient matrix of each layer" can be carried by using the following two methods:

Method 1:

Optionally, the position information of the remaining non-zero coefficients of each layer in the combined coefficient matrix of each layer includes one or more of the following: a second beam set and a second basis vector set where the remaining non-zero coefficients of each layer are located, and third indication information used to indicate positions of the non-zero coefficients in the second beam set and the second basis vector set.

Optionally, sending the non-zero coefficient indication information to the network side includes:

if the non-zero coefficient indication information includes position information of the same position, the position information of the same position being carried in the first part of the channel state information and sent to the network side device;

if the non-zero coefficient indication information includes the second beam set and the second basis vector set, the second beam set and the second basis vector set being carried in the first part of the channel state information and sent to the network side device;

if the non-zero coefficient indication information includes the third indication information, the third indication information being carried in the first part or the second part of the channel state information and sent to the network side device;

if the non-zero coefficient indication information includes the quantity of the remaining non-zero coefficients of each layer, the quantity of the remaining non-zero coefficients of each layer being carried in the first part of the channel state information and sent to the network side device.

A specific implementation of the first method is as follows:

Specifically, the non-zero coefficient indication information includes: the position information of the non-zero coefficients of respective layers of the enhanced Type II codebook structure at the same position in the combined coefficient matrix of respective layers, and the position information on the remaining non-zero coefficients of each layer in the combined coefficient matrix of each layer, and the quantity of the remaining non-zero coefficients for each layer, among them, the position information of the remaining non-zero coefficients of each layer in the combined coefficient matrix of each layer includes: the second beam set and the second basis vector set where the remaining non-zero coefficients of each layer are located, the third indication information used to indicate the positions of non-zero coefficients in the second beam set and the second basis vector set.

That is, the remaining non-zero coefficients of respective layers can be respectively constrained to the coefficient positions corresponding to different remaining non-zero coefficient basis vector sets (i.e., the second basis vector set) and different remaining non-zero coefficient beam sets (i.e., the second beam set). Then the terminal can indicate the same position of the non-zero coefficients of respective layers, and then indicate the beam set and basis vector set where the remaining non-zero coefficients of respective layers are located, and further indicate which positions in these beam sets and basis vector sets have non-zero coefficients. Thus, the network side can determine the specific positions of the non-zero coefficients of each layer according to the information indicated by the terminal.

It can be seen that for the positions of the non-zero coefficients of the two layers shown in Table 1 and Table 2, the remaining non-zero coefficients of the two layers can be represented not only by the above bitmap1 and bitmap2, but also, for the remaining non-zero coefficients of layer one, it can be represented by the remaining non-zero coefficient beam vector set {0, 2, 3} and the non-zero coefficient basis vector set {1,3}, and the bitmap3 as shown in Table 6; for the remaining non-zero coefficients of layer two, it can be represented by the remaining non-zero coefficient beam vector set {1} and the non-zero coefficient base vectors set {1}, and the bitmap4 as shown in Table 7. (It should be noted that there is one row and one column in Table 7.)

TABLE 6

| bitmap3 | |
|---|---|
| 0 | 1 |
| 1 | 0 |
| 0 | 1 |

TABLE 7

| bitmap4 |
|---|
| 1 |

Correspondingly, sending the non-zero coefficient indication information to the network side includes:
the position information of the same location, the quantity of the second beam set and the second basis vector set of each layer, and the remaining non-zero coefficients of each layer are carried in the first part of the channel state information and sent to the network side;
the third indication information is carried in the second part of the channel state information and sent to the network side.

Among them, the second beam set, the second basis vector set, the quantity of remaining non-zero coefficients of each layer, and the third indication information are reported in different parts of the CSI, which can further reduce the signaling overhead.

Method 2:

Optionally, the position information of the remaining non-zero coefficients of each layer in the combined coefficient matrix of each layer includes one or more of following: a first union of beam sets where the remaining non-zero coefficients of respective layers are located and a second union of basis vector sets where the remaining non-zero coefficients of respective layers are located, and fifth indication information used to indicate positions of the remaining non-zero coefficients of each layer in the first union and the second union.

Optionally, sending the non-zero coefficient indication information to the network side includes:
if the non-zero coefficient indication information includes the position information of the same position, the position information of the same position being carried in the first part of the channel state information and sent to the network side device;
if the non-zero coefficient indication information includes the first union and the second union, the first union and the second union being carried in the first part of the channel state information and sent to the network side device;
if the non-zero coefficient indication information includes the fifth indication information, the fifth indication information being carried in the first part or the second part of the channel state information and sent to the network side device;
if the non-zero coefficient indication information includes the quantity of the remaining non-zero coefficients of each layer, then the quantity of the remaining non-zero coefficients of each layer being carried in the first part of the channel state information and sent to the network side device.

Among them, a specific implementation of the second method is as follows:

Specifically, the non-zero coefficient indication information includes: the position information of the non-zero coefficients of each layer of the enhanced Type II codebook structure at the same position in the combined coefficient matrix of each layer, the position information of the remaining non-zero coefficients of each layer in the combined coefficient matrix of each layer, and the quantity of the remaining non-zero coefficients of each layer, among them, the position information of the remaining non-zero coefficients in the combined coefficient matrix of each layer includes: the first union of the beam sets where the remaining non-zero coefficients of each layer are located, and the second union of the basis vector sets where the remaining non-zero coefficients of each layer are located, and the fifth indication information used to indicate the positions of the remaining non-zero coefficients of each layer in the first union and the second union.

That is, if the remaining non-zero coefficients of each layer can be respectively constrained to the positions corresponding to the same remaining non-zero coefficient basis vector set (i.e., the first union) and the same remaining non-zero coefficient beam set (i.e., the second union), then the terminal can indicate the same position of the non-zero coefficients of each layer, and further indicate which positions in these beam sets and basis vector sets have non-zero coefficients. Thus, the network side can determine the specific positions of the non-zero coefficients of each layer according to the information indicated by the terminal.

It can be seen that for the positions of the non-zero coefficients of the two layers shown in Table 1 and Table 2, the positions of the remaining non-zero coefficients of layer one and layer two can be indicated in the following manner:

The first union of the beam sets where the remaining non-zero coefficients of layer one and layer two are located is {0, 1, 2, 3}, and the second union of the basis vector sets where the remaining non-zero coefficients of layer one and layer two are located is {1,3}, among them, the bitmap5 shown in Table 8 is used to indicate the positions of the non-zero coefficients of layer one in the first union and the second union, and the bitmap6 shown in Table 9 is used to indicate the positions of the non-zero coefficients of layer two in the first union and the second union.

TABLE 8

| bitmap5 | |
|---|---|
| 0 | 1 |
| 0 | 0 |
| 1 | 0 |
| 0 | 1 |

TABLE 9

| bitmap6 | |
|---|---|
| 0 | 0 |
| 0 | 0 |
| 1 | 0 |
| 0 | 0 |

Correspondingly, sending the non-zero coefficient indication information to the network side includes:
the location information of the same location, the first union and the second union, and the quantity of the remaining non-zero coefficients of each layer are carried in the first part of the channel state information and sent to the network side;
the fifth indication information is carried in the second part of the channel state information and sent to the network side.

Among them, the position information of the same position, the first union and the second union, the quantity of remaining non-zero coefficients of each layer, and the fifth indication information are reported in different parts of the CSI, which can further reduce signaling overhead.

Situation 4:

Optionally, the non-zero coefficient indication information includes one or more of the following: a third union of positions of non-zero coefficients of respective layers in the combined coefficient matrix of respective layers in the enhanced Type II codebook structure, seventh indication information used to indicate whether a coefficient of each layer at the position of the third union is zero, and the quantity of non-zero coefficients of each layer.

Optionally, sending the non-zero coefficient indication information to the network side includes:
if the non-zero coefficient indication information includes the third union, the third union being carried in the first part of the channel state information and sent the network side device;
if the non-zero coefficient indication information includes the seventh indication information, the seventh indication information being carried in the first part or the second part of the channel state information and sent to the network side device;
if the non-zero coefficient indication information includes the quantity of non-zero coefficients of each layer, then the quantity of non-zero coefficients of each layer being carried in the first part of the channel state information and sent to the network side device.

One specific implementation is as follows:

Specifically, the non-zero coefficient indication information includes: the third union of the positions of the non-zero coefficients of each layer of the enhanced Type II codebook structure in the combined coefficient matrix of each layer, the seventh indication information used to indicate whether the coefficient of each layer at the position of the third union is zero, and the quantity of non-zero coefficients in each layer.

That is, the terminal can first indicate the third union of the positions of the non-zero coefficients of each layer, and then respectively indicate whether the positions of each layer in the third union are zero, so that the specific position of the non-zero coefficients of each layer can be determined.

Among them, the third union of the positions of the non-zero coefficients of each layer in the combined coefficient matrix of each layer can be represented by a bitmap, and a value of 1 in a certain position in the bitmap indicates that a non-zero coefficient is at the position. The seventh indication information used to indicate whether the coefficient of each layer at the position of the third union is zero can also be represented by a bitmap, and a value of 1 at a certain position in the bitmap which is used to represent the seventh indication information of a certain layer, indicates that a non-zero coefficient is at the position.

Among them, when the enhanced Type II codebook structure includes two layers, for the third union set above, a bitmap7 can be used to represent all the non-zero coefficient positions of the two layers. If the quantity of 1s in bitmap7 is N, then bitmap8 with length N can be used to indicate the non-zero coefficients of layer one which are not contained in layer two. Among them, the position of 1 in bitmap8 indicates that the position of the non-zero coefficient belongs to layer one, and the position of 0 indicates that the non-zero coefficient does not belong to layer one. In the same way, bitmap9 with length N can be used to represent the non-zero coefficients of layer two are not contained in layer one, where the position of 1 in bitmap9 indicates that the position of the non-zero coefficient belongs to layer two, and the position of 0 indicates that the non-zero coefficient does not belong to layer two.

That is, bitmap7 and bitmap8 determine the specific position of the non-zero coefficients of layer one; bitmap7 and bitmap9 determine the position of the non-zero coefficients of layer two. In addition, bitmap7 can be carried in the first part of the CSI and reported, and bitmap8 and bitmap9 can be carried in the second part of the CSI and reported.

Specifically, for example, when the terminal reports the positions of the non-zero coefficients of layer one and layer two shown in Table 1 and Table 2, the bitmap7 shown in Table 10 can be used to indicate all the positions of the non-zero coefficients of layer one and layer two.

TABLE 10

| bitmap7 | | | |
|---|---|---|---|
| 1 | 0 | 1 | 1 |
| 0 | 1 | 1 | 0 |
| 1 | 1 | 0 | 1 |
| 0 | 0 | 1 | 1 |

Among them, the quantity of 1 in the above bitmap7 is 10, then the bitmap8 shown in Table 11 can be used to indicate the position of the non-zero coefficients of layer one that does not belong to layer two.

TABLE 11

| | | | | bitmap8 | | | | | |
|---|---|---|---|---|---|---|---|---|---|
| 1 | 1 | 1 | 0 | 1 | 1 | 1 | 1 | 1 | 1 |

Among them, each bit in bitmap8 corresponds to a bit with a value of 1 in bitmap7. Specifically, here, the first to third bits of bitmap8 correspond to the bits in the first row of bitmap7 that have a value of 1, and the fourth to fifth bits of bitmap8 correspond to those bits in the second row of bitmap7 that have a value of 1. and the sixth to eighth bits of bitmap8 correspond to the bits in the third row of bitmap7 that have a value of 1, and the ninth to tenth bits of bitmap8 correspond to the bits in the fourth row of bitmap7 that have a value of 1.

In the same way, bitmap9 shown in Table 12 can be used to indicate the positions of non-zero coefficients in layer two that do not belong to layer one.

TABLE 12

| | | | | bitmap9 | | | | | |
|---|---|---|---|---|---|---|---|---|---|
| 1 | 1 | 0 | 1 | 1 | 1 | 0 | 1 | 1 | 0 |

Among them, each bit in bitmap9 corresponds to a bit in bitmap7 with a value of 1. Specifically, here, the first to third bits of bitmap9 correspond to the bits in the first row of bitmap7 that have a value of 1, and the fourth to fifth bits of bitmap9 correspond to the bits in the second row of bitmap7 that have a value of 1, and the sixth to eighth bits of bitmap9 correspond to the bits in the third row of bitmap7 that have a value of 1, and the ninth to tenth bits of bitmap9 correspond to the bits in the fourth row of bitmap7 that have a value of 1.

Correspondingly, sending the non-zero coefficient indication information to the network side includes:

the third union and the quantity of non-zero coefficients of each layer are carried in the first part of the channel state information and sent to the network side;

the seventh indication information is carried in the second part of the channel state information and sent to the network side.

Among them, the third union, the quantity of non-zero coefficients of each layer, and the seventh indication information are reported in different parts of the CSI, which can further reduce signaling overhead.

Situation 5:

Optionally, the non-zero coefficient indication information includes one or more of the following: the position information of the non-zero coefficients of respective layers at a same position in the combined coefficient matrix of respective layers in the enhanced Type II codebook structure, eighth indication information used to indicate whether a coefficient of each layer at a remaining position in the combined coefficient matrix of each layer is zero, and the quantity of non-zero coefficients in each layer at the remaining positions; the remaining positions are positions in the combined coefficient matrix other than the same position.

Optionally, sending the non-zero coefficient indication information to the network side includes:

if the non-zero coefficient indication information includes the position information of the same position, the position information of the same position being carried in the first part of the channel state information and sent to the network side device;

if the non-zero coefficient indication information includes the eighth indication information, the eighth indication information being carried in the first part or the second part of the channel state information and sent to the network side device;

if the non-zero coefficient indication information includes the quantity of non-zero coefficients of each layer at the remaining positions, the quantity of non-zero coefficients of each layer at the remaining positions being carried in the first part of the channel state information and sent to the network side device.

One specific implementation is as follows:

Specifically, the non-zero coefficient indication information includes: the position information of the non-zero coefficients of each layer of the enhanced Type II codebook structure at the same position in the combined coefficient matrix of each layer, the eighth indication information used to indicate whether the coefficient of each layer at the remaining position in the combined coefficient matrix of each layer is zero, and the quantity of non-zero coefficients in each layer at the remaining positions; the remaining positions are the positions in the combined coefficient matrix other than the same positions.

Among them, the position information of the non-zero coefficients of each layer at the same position in the combined coefficient matrix of each layer can be represented by a bitmap, and a value of 1 in a bitmap indicates that a non-zero coefficient is at the position. The eighth indication information used to indicate whether the coefficient of each layer at the remaining position in the combined coefficient matrix of each layer is zero can also be represented by a bitmap, and a value of 1 in a certain position in the bitmap which is used to represent the eighth indication information of a certain layer, indicates that a non-zero coefficient is at the position.

Specifically, when the enhanced Type II codebook structure includes two layers, a bitmap10 can be used to indicate the same position of the non-zero coefficients of the two layers. If the quantity of zeros in bitmap10 is N, then bitmap11 with a length of N can be used to indicate the position of the remaining non-zero coefficients in layer one, and bitmap12 with a length of N can be used to indicate the position of the remaining non-zero coefficients in layer two.

That is, bitmap10 and bitmap11 determine the specific positions of the non-zero coefficients of layer one; bitmap10 and bitmap12 determine the specific positions of the non-zero coefficients of layer two. In addition, bitmap10 can be carried in the first part of the CSI, and bitmap11 and bitmap12 can be carried in the second part of the CSI.

For example, when the terminal reports the positions of the non-zero coefficients of layer one and layer two shown in Table 1 and Table 2, the bitmap10 shown in Table 13 can be used to indicate the same positions of the non-zero coefficients of layer one and layer two.

TABLE 13

| | bitmap10 | | |
|---|---|---|---|
| 1 | 0 | 1 | 0 |
| 0 | 0 | 1 | 0 |
| 1 | 0 | 0 | 1 |
| 0 | 0 | 1 | 0 |

Among them, the number of 0 in the above bitmap10 is 10, then the bitmap11 shown in Table 14 can be used to represent positions of the remaining non-zero coefficients in layer one.

TABLE 14

| bitmap11 | | | | | | | | | |
|---|---|---|---|---|---|---|---|---|---|
| 0 | 1 | 0 | 0 | 0 | 1 | 0 | 0 | 0 | 1 |

Among them, each bit in bitmap11 corresponds to a bit with a value of 0 in bitmap10. Specifically, here, the first to second bits of bitmap11 correspond to the bits in the first row of bitmap10 that have a value of 0, and the third to fifth bits of bitmap11 correspond to the bits in the second row of bitmap10 that have a value of 0, and the sixth to seventh bits of bitmap11 correspond to the bit with a value of 0 in the third row of bitmap10, and the eighth to tenth bits of bitmap11 correspond to the bits in the fourth row of bitmap10 that have a value of 1.

In the same way, the bitmap12 shown in Table 15 can be used to indicate the position of the remaining non-zero coefficients in layer two.

TABLE 15

| bitmap12 | | | | | | | | | |
|---|---|---|---|---|---|---|---|---|---|
| 0 | 0 | 0 | 1 | 0 | 0 | 0 | 0 | 0 | 0 |

Among them, each bit in bitmap12 corresponds to a bit with a value of 0 in bitmap10. Specifically, the first to second bits of bitmap12 correspond to the bits in the first row of bitmap10 that have a value of 0, and the third to fifth bits of bitmap12 correspond to the bits in the second row of bitmap10 that have a value of 0, and the sixth to seventh bits of bitmap12 correspond to the bits in the third row of bitmap10 that have a value of 0, and the eighth to tenth bits of bitmap12 correspond to the bits in the fourth row of bitmap10 that have a value of 1.

Correspondingly, sending the non-zero coefficient indication information to the network side includes:
the position information of the same position and the quantity of non-zero coefficients in the remaining positions of each layer are carried in the first part of the channel state information and sent to the network side;
the eighth indication information is carried in the second part of the channel state information and sent to the network side.

Among them, the position information of the same position, and the quantity of the non-zero coefficients of each layer in the remaining positions, and the eighth indication information are reported in different parts of the CSI, which can further reduce the signaling overhead.

Situation 6:
Optionally, the non-zero coefficient indication information includes one or more of the following: the non-zero coefficient indication information includes one or more of the following: position information of a first position of non-zero coefficients of a first layer in a combined coefficient matrix of a first layer, a quantity of different positions between the second position and the first position, and position information of the different positions; wherein, the second position is a position of non-zero coefficients of a second layer in a combined coefficient matrix of a second layer; the first layer is any layer included in the enhanced Type II codebook structure, and the second layer is any layer included in the enhanced Type II codebook structure other than the first layer.

Optionally, sending the non-zero coefficient indication information to the network side includes:

if the non-zero coefficient indication information includes the position information of the first position, the position information of the first position being carried in the first part of the channel state information and sent to the network side device;

if the non-zero coefficient indication information includes the position information of the different positions, the position information of the different positions being carried in the first part or the second part of the channel state information and sent to the network side device;

if the non-zero coefficient indication information includes the quantity of different positions between the second position and the first position, the quantity of the different positions between the second position and the first position being carried in the first part of the channel state information and sent to the network side device.

One specific implementation is as follows:
Specifically, the non-zero coefficient indication information includes: the position information of the first position of the non-zero coefficient of the first layer in the combined coefficient matrix of the first layer, the quantity of the different positions between the second position and the first position, and the position information of the different positions;

Among them, the second position is the position of the non-zero coefficients of the second layer in the combined coefficient matrix of the second layer; the first layer is any layer included in the enhanced Type II codebook structure, and the second layer is any layer included in the enhanced Type II codebook structure except for the first layer.

That is, the terminal can first indicate the specific position of the non-zero coefficients of one of the layers (for example, the first layer), and then indicate the difference between the positions of the non-zero coefficients of the first layer and the other layers (that is, the other layers except the first layer, which can be called the second layer).

Among them, the specific position of the non-zero coefficient of the first layer can be represented by bitmap1' (as shown in Table 1), and a value of 1 in the bitmap indicates that there is a non-zero coefficient in this position. The indication information used to indicate the different positions of the non-zero coefficients between the second layer and the first layer can be represented in the form of a position index. At this time, the terminal needs to report the quantity of different positions of the non-zero coefficients between the second layer and the first layer to the network side. Specifically, when the enhanced Type II codebook structure includes two layers, if the quantity of different positions of the non-zero coefficients between layer one and layer two is 4, then $$\log_2 \binom{16}{4} = 11$$

bits are needed to indicate the different positions of the non-zero coefficients between layer one and layer two. Then the network side can obtain the specific position of the non-zero coefficient of layer two according to bitmap1' combined with bitmap13 calculated by 11 bits.

In addition, the indication information used to indicate the different positions of the non-zero coefficients between the second layer and the first layer can also be represented by a bitmap. Then the value of 1 in the bitmap indicates whether the layer has a non-zero coefficient at this position is different from the first layer Specifically, when the enhanced Type II codebook structure includes two layers, bitmap1' is used to indicate the specific positions of the non-zero coefficients of layer one (as shown in Table 1 above), and bitmap13 is used to indicate the difference between the positions of the non-zero coefficients of layer two and the non-zero coefficients of layer one. That is, bitmap1' combined with bitmap13 determines the specific position of the non-zero coefficients of layer two. In addition, bitmap1' and the quantity of different positions of non-zero coefficients between layer one and layer two can be carried in the first part of the CSI, and bitmap13 can be carried in the second part of the CSI.

For example, when the terminal reports the positions of the non-zero coefficients of layer one and layer two shown in Table 1 and Table 2, the bitmap13 shown in Table 16 can be used to indicate the different positions of the non-zero coefficients between layer one and layer two. Among them, the 1 in bitmap13 indicates that the result of whether there is a non-zero coefficient at the position in layer one and layer two is different.

TABLE 16

| bitmap13 | | | |
|---|---|---|---|
| 0 | 0 | 0 | 0 |
| 0 | 1 | 0 | 1 |
| 0 | 1 | 0 | 1 |
| 0 | 0 | 0 | 0 |

Among them, it should be noted that the quantity of bits required when the indication information used to indicate the different positions of the non-zero coefficients between the second layer and the first layer is represented in the form of a position index is less than the quantity of bits required when represented in the form of bitmap.

Correspondingly, sending the non-zero coefficient indication information to the network side includes:
the location information of the first position, and the quantity of different positions between the second position and the first position, are carried in the first part of the channel state information and sent to the network side;
the position information of the different positions is carried in the second part of the channel state information and sent to the network side.

Among them, the position information of the first position, the quantity of different positions between the second position and the first position, and the position information of the different positions are reported in different parts of the CSI, which can further reduce the signaling overhead.

Situation 7

Optionally, the non-zero coefficient indication information includes one or more of the following: first target position information, second target position information, and a quantity of non-zero coefficients of each layer included in a target layer; wherein the target layer includes at least one of layers in the enhanced Type II codebook structure; the first target position information is position information of non-zero coefficients of each layer included in the target layer in a corresponding combined coefficient matrix; the second target position information is position information of non-zero coefficients of layers other than a layer included in the target layer in the layers in the enhanced Type II codebook structure in the corresponding combined coefficient matrix.

Optionally, sending the non-zero coefficient indication information to the network side includes:
if the non-zero coefficient indication information includes the first target location information, the first target location information being carried in the second part of the channel state information and sent to the network side device;
if the non-zero coefficient indication information includes the second target location information, the second target location information being carried in the first part of the channel state information and sent to the network side device;
if the non-zero coefficient indication information includes the quantity of non-zero coefficients of each layer included in the target layer, then the quantity of non-zero coefficients of each layer included in the target layer being carried in the first part of the channel state information and sent to the network side device.

One specific implementation is as follows:

Specifically, the non-zero coefficient indication information includes: first target position information, second target position information, and the quantity of non-zero coefficients of each layer included in the target layer; among them, the target layer includes at least one of the layers of the enhanced Type II codebook structure; the first target position information is the position information of the non-zero coefficients of each layer included in the target layer in the corresponding combined coefficient matrix; the second target position information is the position information of the non-zero coefficients of other layers except the layers included in the target layer in the layer of the enhanced Type II codebook structure in the corresponding combined coefficient matrix.

Correspondingly, sending the non-zero coefficient indication information to the network side includes:
the second target position information and the quantity of non-zero coefficients of each layer included in the target are carried in the first part of the channel state information and sent to the network side;
the first target location information is carried in the second part of the channel state information and sent to the network side.

That is, assuming that the enhanced Type II codebook structure includes layer one and layer two, where layer one contains K1 (less than 2L*M) non-zero coefficients, and layer two contains K2 (less than 2L*M) non-zero coefficients, the quantity of non-zero coefficients K2 and bitmap1' indicating the non-zero coefficient positions of layer one can be reported respectively in the first part of the CSI, and bitmap2' indicating the non-zero coefficient positions of layer two can be reported respectively in the second part of the CSI, or the positions of the non-zero coefficients of layer two can be represented by $$\log_2 \binom{2L*M}{K2}$$

bits using a combination index.

Specifically, for the positions of the non-zero coefficients of the two layers shown in Table 1 and Table 2, the quantity of non-zero coefficients of layer two K2=7 and the bitmap1' of layer one which are used to indicate the positions of non-zero coefficients can be reported in the first part of the CSI; the bitmap2' of the layer two which is used to indicate the position of the non-zero coefficient of the layer two can be reported in the second part of the CSI, or the combined position index of layer two which is $$\log_2\binom{16}{7} = 14$$

is reported in the second part of the CSI.

Situation 8

Optionally, the non-zero coefficient indication information includes one or more of the following: a fourth union of beam sets where the non-zero coefficients of each layer in the enhanced Type II codebook structure are located, and a fifth union of basis vector sets where the non-zero coefficients of each layer are located, and ninth indication information used to indicate positions of the non-zero coefficients of each layer in the fourth union and the fifth unions, and the quantity of non-zero coefficients of each layer.

Optionally, sending the non-zero coefficient indication information to the network side includes:

if the non-zero coefficient indication information includes the fourth union and the fifth union, the fourth union and the fifth union being carried in the first part of the channel state information and sent to the network side device;

if the non-zero coefficient indication information includes the ninth indication information, the ninth indication information being carried in the first part or the second part of the channel state information and sent to the network side device;

if the non-zero coefficient indication information includes the quantity of non-zero coefficients in each layer, the number of non-zero coefficients in each layer being carried in the first part of the channel state information and sent to the network side device.

One specific implementation is as follows:

Specifically, the non-zero coefficient indication information includes: the fourth union of the beam sets where the non-zero coefficients of each layer of the enhanced Type II codebook structure are located, the fifth union of the basis vector sets where the non-zero coefficients of each layer are located, the ninth indication information used to indicate the positions of the non-zero coefficients of each layer in the fourth union and the fifth unions, and the quantity of non-zero coefficients of each layer.

Correspondingly, sending the non-zero coefficient indication information to the network side includes:

the fourth union, the fifth union, and the quantity of non-zero coefficients of each layer are carried in the first part of the channel state information and sent to the network side;

the ninth indication information is carried in the second part of the channel state information and sent to the network side.

That is, assuming that the enhanced Type II codebook structure includes layer one and layer two, where layer one contains K1 (less than 2L*M) non-zero coefficients, and layer two contains K2 (less than 2L*M) non-zero coefficients, the quantity of non-zero coefficients of layer one and layer two (K1 and K2) can be reported respectively in the first part of the CSI, then a bitmap16 can be used to indicate the approximate positions of the non-zero coefficients of the layer one and layer two respectively, and the bitmap16 can be determined by the beam sets and the basis vector sets where the non-zero coefficients are located, specifically, the bitmap16 can be the union of the beams where the non-zero coefficients of the layer one and layer two are located and the union of the base vectors where the non-zero coefficients of the layer one and layer two are located. Then, bitmap18 and bitmap19 are respectively reported in the second part of the CSI to indicate the specific positions of the non-zero coefficients of layer one and layer two.

Specifically, for the positions of the non-zero coefficients of the two layers shown in Table 1 and Table 2, the quantity of non-zero coefficients of layer one and layer two reported in the first part of the CSI is K1=9 and K2=7 respectively. The union $\{1, 2, 3, 4\}$ of the beam sets where the non-zero coefficients of layer one and layer two are located and the union $\{1, 2, 3, 4\}$ of the basis vector sets where the non-zero coefficients of layer one and layer two are located, are represented by bitmap20 (as shown in Table 21).

TABLE 21

| bitmap20 | | | | | | | |
|---|---|---|---|---|---|---|---|
| 1 | 1 | 1 | 1 | 1 | 1 | 1 | 1 |

Then the specific positions of the non-zero coefficients of layer one and layer two are respectively reported in the second part of the CSI. The specific positions of the non-zero coefficients of layer one is represented by bitmap21 as shown in Table 22.

TABLE 22

| bitmap21 | | | |
|---|---|---|---|
| 1 | 0 | 1 | 1 |
| 0 | 0 | 1 | 0 |
| 1 | 1 | 0 | 1 |
| 0 | 0 | 1 | 1 |

The specific positions of the non-zero coefficients of layer two are represented by bitmap22 (as shown in Table 23).

TABLE 23

| bitmap22 | | | |
|---|---|---|---|
| 1 | 0 | 1 | 0 |
| 0 | 1 | 1 | 0 |
| 1 | 0 | 0 | 1 |
| 0 | 0 | 1 | 0 |

In summary, in the embodiments of the present disclosure, the terminal can determine the enhanced Type II codebook structure according to the received codebook parameter information sent by the network side, so as to determine the non-zero coefficient indication information (used to indicate the non-zero coefficient related information in the combined coefficient matrix in the enhanced Type II codebook structure) according to the determined enhanced Type II codebook structure, so that the terminal can send the non-zero coefficient indication information to the network side, which realizes CSI feedback for the codebook structure of Rel-16.

The Second Embodiment

As shown in FIG. 3, the embodiment of the present disclosure provides a channel state information receiving method, which is applied to the network side device. Among them, the network side device may specifically be a base station.

The channel state information receiving method specifically includes the following steps:

Step 301: sending codebook parameter information to the terminal.

Among them, the channel state information receiving method of the embodiment of the present disclosure is suitable for the enhanced Type II codebook structure (that is, the low-overhead Type II codebook structure defined in NR Rel-16), which is a method based on linear combination of orthogonal beams and subband coefficient compression.

In addition, the codebook parameter information includes the quantity of beams and the quantity of base vectors.

Step 302: receiving the non-zero coefficient indication information sent by the terminal.

Among them, the non-zero coefficient indication information is used to indicate the related information of non-zero coefficients in the combined coefficient matrix in the enhanced Type II codebook structure, and the enhanced Type II codebook structure is determined by the terminal according to the codebook parameter information. The related information includes one or more of the following: position information of the non-zero coefficients of each layer in the combined coefficient matrix of each layer in the enhanced Type II codebook structure, and the quantity of the non-zero coefficients of each layer.

In addition, the specific content included in the non-zero coefficient indication information includes the following situations.

Situation 1:

Optionally, the non-zero coefficient indication information includes one or more of the following: the position information of the non-zero coefficients of each layer of the enhanced Type II codebook structure in the combined coefficient matrix of each layer, and the quantity of the non-zero coefficients of each layer.

One specific implementation is as follows:

Specifically, the non-zero coefficient indication information includes the position information of the non-zero coefficients of each layer of the enhanced Type II codebook structure in the combined coefficient matrix of each layer.

Specifically, the position information of the non-zero coefficients of each layer in the combined coefficient matrix of each layer may be represented in the form of a bitmap, or may be represented in the form of an index set.

A specific example is as follows:

When the low-overhead Type II codebook structure defined in NR Rel-16 includes two layers (layer one and layer two), assuming that each layer has K0 (less than 2L*M) non-zero coefficients, then each layer has K0 positions of the non-zero coefficient that need to be reported to the base station. 2L represents the quantity of beams, and M represents the quantity of base vectors.

The following reporting methods can be used:

Each layer reports a bitmap with a size of 2L*M, where a bit value of 1 indicates that the coefficient at the corresponding position is non-zero; or, Each layer reports the index of each coefficient of K0 non-zero coefficients in 2L*M coefficients, the size is $$\log_2 \binom{2L*M}{K0}$$

bytes.

In addition, another specific implementation is as follows:

Specifically, the non-zero coefficient indication information includes: the position information of the non-zero coefficients of each layer of the enhanced Type II codebook structure in the combined coefficient matrix of each layer and the quantity of the non-zero coefficients of each layer.

That is, assuming that the enhanced Type II codebook structure includes layer one and layer two, where layer one contains K1 (less than 2L*M) non-zero coefficients, and layer two contains K2 (less than 2L*M) non-zero coefficients, then the quantity of non-zero coefficients of layer one and layer two (K1 and K2) may be reported respectively in the first part of the CSI, and bitmap1 and bitmap2 which are used to indicate the position information of the non-zero coefficients may be reported in the second part of the CSI.

Situation 2:

Optionally, the non-zero coefficient indication information includes one or more of the following: a first beam set and a first basis vector set where the non-zero coefficients of each layer in the enhanced Type II codebook structure are located, first indication information used to indicate positions of non-zero coefficients in the first beam set and the first basis vector set, and a quantity of non-zero coefficients of each layer.

One specific implementation is as follows:

Specifically, the first beam set and the first basis vector set where the non-zero coefficients of each layer of the enhanced Type II codebook structure are located, the first indication information used to indicate the positions of non-zero coefficients in the first beam set and the first basis vector set, and the quantity of non-zero coefficients in each layer.

Among them, the beam set where the non-zero coefficients are located can be defined as a "non-zero coefficient beam set", and the basis vector set where the non-zero coefficients are located can be defined as a "non-zero coefficient basis vector set". Then the first beam set is a non-zero coefficient beam set, and the first basis vector set is a non-zero coefficient basis vector set.

In addition, the non-zero coefficient beam set and the non-zero basis vector set can be indicated by a bitmap or index set. For example, if the non-zero coefficient beam set contains 2L, the length of the bitmap is 2L. If there are K beam vectors with non-zero coefficients, then K bits are set to 1, or the index set indications containing K elements can be used, such as {2, 3, 5 . . . }, which means the beam vectors of 2, 3, 5, etc. contain non-zero coefficients. Similarly, if the basis vector set contains M, the length of the bitmap is M, where N bits are set to 1, indicating that the N base vectors contain non-zero coefficients. If the index set is used, such as {1, 2, 4 . . . }, it means that these base vectors of 1, 2, 4, etc. contain non-zero coefficients.

In addition, the non-zero coefficients are constrained to the coefficient positions corresponding to the non-zero coefficient basis vector set and the non-zero coefficient beam set, and this position can be defined as a candidate coefficient position. That is, the coefficient positions corresponding to the first beam set and the first basis vector set are candidate coefficient positions. Then, the terminal may first indicate the position of the candidate coefficient, and then further indicate (bitmap or position index) which positions on the candidate coefficient positions have non-zero coefficients.

For example, for the non-zero coefficients of layer one, the non-zero coefficient basis vector set reported by the terminal includes base vector 1 and base vector M−1, and the reported non-zero coefficient beam set includes beams 1 and 2L. In this way, the candidate coefficient positions include 4L+2(M−2) positions in the box as shown in FIG. 2. In addition, the terminal further reports a bitmap of 4L+2 (M−2) bits, indicating which positions in the box shown in FIG. 2 have non-zero coefficients.

Situation 3:

Optionally, the non-zero coefficient indication information includes one or more of the following: the position information of the non-zero coefficients of each layer of the enhanced Type II codebook structure at the same position in the combined coefficient matrix of each layer, the position information of the remaining non-zero coefficients of each layer in the combined coefficient matrix of each layer, and the quantity of the remaining non-zero coefficients of each layer;

among them, the remaining non-zero coefficients are non-zero coefficients at positions other than the same position in the combined coefficient matrix.

One specific implementation is as follows:

Specifically, the non-zero coefficient indication information includes: the position information on the non-zero coefficient of each layer of the enhanced Type II codebook structure at the same position in the combined coefficient matrix of each layer, the position information of the remaining non-zero coefficients of each layer in the combined coefficient matrix of each layer, and the quantity of the remaining non-zero coefficients of each layer; among them, the remaining non-zero coefficients are non-zero coefficients at the positions other than the same position in the combined coefficient matrix.

Among them, the position information of the non-zero coefficients of each layer at the same position in the combined coefficient matrix of each layer can be represented by a bitmap, and a value of 1 in a bitmap indicates that a non-zero coefficient is at the position. The position information of the remaining non-zero coefficients of each layer in the combined coefficient matrix of each layer can be represented in the form of a bitmap, or can also be represented in the form of a position index.

For example, when the low-overhead Type II codebook structure defined in NR Rel-16 includes two layers (i.e., layer one and layer two), assume that layer one contains K1 (less than 2L*M) non-zero coefficients, and layer two contains K2 (less than 2L*M) non-zero coefficients, where 2L represents the quantity of beams, and M represents the quantity of base vectors.

Among them, the same position indication of the non-zero coefficients of each layer can be indicated by a 2L*M bitmap0, where 1 indicates that a non-zero coefficient is at the position. Let bitmap1' and bitmap2' indicate the positions of the non-zero coefficients of layer one and layer two with a size of 2L*M, respectively. Then bitmap1' and bitmap2' respectively removes the non-zero coefficient positions in bitmap0, and the positions of the remaining non-zero coefficients of layer one and layer two can be obtained, and bitmap1 and bitmap2 can be used to indicate the positions of the remaining non-zero coefficients respectively.

In addition, the content included in the above-mentioned "the position information of the remaining non-zero coefficients of each layer in the combined coefficient matrix of each layer" can be carried by using the following two methods:

Method 1:

Optionally, the position information of the remaining non-zero coefficients of each layer in the combined coefficient matrix of each layer includes one or more of the following: a second beam set and a second basis vector set where the remaining non-zero coefficients of each layer are located, and the third indication information used to indicate the positions of the non-zero coefficients in the second beam set and the second basis vector set.

A specific implementation of the first method is as follows:

Specifically, the non-zero coefficient indication information includes: the position information of the non-zero coefficients of each layer of the enhanced Type II codebook structure at the same position in the combined coefficient matrix of each layer, and the position information of the remaining non-zero coefficients of each layer in the combined coefficient matrix of each layer, and the quantity of the remaining non-zero coefficients for each layer, among them, the position information of the remaining non-zero coefficients of each layer in the combined coefficient matrix of each layer includes: the second beam set and the second basis vector set where the remaining non-zero coefficients of each layer are located, and third indication information used to indicate the positions of non-zero coefficients in the second beam set and the second basis vector set.

That is, the remaining non-zero coefficients of each layer can be respectively constrained to the coefficient positions corresponding to different remaining non-zero coefficient basis vector sets (i.e., the second basis vector set) and different remaining non-zero coefficient beam sets (i.e., the second beam set). Then the terminal can indicate the same position of the non-zero coefficients of each layer, and then indicates the beam set and basis vector set where the remaining non-zero coefficients of each layer are located, and further indicate which positions in these beam sets and basis vector sets have non-zero coefficients. Thus, the network side can determine the specific positions of the non-zero coefficients of each layer according to the information indicated by the terminal.

Method 2:

Optionally, the position information of the remaining non-zero coefficients of each layer in the combined coefficient matrix of each layer includes: the first union of the beam sets where the remaining non-zero coefficients of each layer are located and the second union of the basis vector sets where the remaining non-zero coefficients of each layer are located, and the fifth indication information used to indicate the positions of the remaining non-zero coefficients of each layer in the first union and the second union.

Among them, a specific implementation of the second method is as follows:

Specifically, the non-zero coefficient indication information includes: the position information of the non-zero coefficients of each layer of the enhanced Type II codebook structure at the same position in the combined coefficient matrix of each layer, the position information of the remaining non-zero coefficients of each layer in the combined coefficient matrix of each layer, and the quantity of the remaining non-zero coefficients of each layer, among them, the position information of the remaining non-zero coefficients in the combined coefficient matrix of each layer includes: the first union of the beam sets where the remaining non-zero coefficients of each layer are located, and the second union of the basis vector sets where the remaining non-zero coefficients of each layer are located, and the fifth indication information used to indicate the positions of the remaining non-zero coefficients of each layer in the first union and the second union.

That is, if the remaining non-zero coefficients of each layer can be respectively constrained to the positions corresponding to the same remaining non-zero coefficient basis vector set (i.e., the first union) and the same remaining non-zero coefficient beam set (i.e., the second union), then the terminal can indicate the same position of the non-zero coefficients of each layer, and further indicate which positions in these beam sets and basis vector sets have non-zero coefficients. Thus, the network side can determine the specific positions of the non-zero coefficients of each layer according to the information indicated by the terminal.

Situation 4:

Optionally, the non-zero coefficient indication information includes one or more of the following: the third union of the positions of the non-zero coefficients of each layer of the enhanced Type II codebook structure in the combined coefficient matrix of each layer, the seventh indication information used to indicate whether the coefficient of each layer at the position of the third union is zero, and the quantity of non-zero coefficients in each layer.

One specific implementation is as follows:

Specifically, the non-zero coefficient indication information includes: the third union of the positions of the non-zero coefficients of each layer of the enhanced Type II codebook structure in the combined coefficient matrix of each layer, the seventh indication information used to indicate whether the coefficient of each layer at the position of the third union is zero, and the quantity of non-zero coefficients in each layer.

That is, the terminal can first indicate the third union of the positions of the non-zero coefficients of each layer, and then respectively indicate whether the positions of each layer in the third union is zero, so that the specific position of the non-zero coefficients of each layer can be determined.

Among them, the third union of the positions of the non-zero coefficients of each layer in the combined coefficient matrix of each layer can be represented by a bitmap, and a value of 1 in a certain position in the bitmap indicates that at the position is a non-zero coefficient. The seventh indication information used to indicate whether the coefficient of each layer at the position of the third union is zero can also be represented by a bitmap, and a value of 1 in a certain position in the bitmap which is used to represent the seventh indication information of a certain layer, indicates that at the position is a non-zero coefficient.

Among them, when the enhanced Type II codebook structure includes two layers, for the third union set above, a bitmap7 can be used to represent all the non-zero coefficient positions of the two layers. If the quantity of 1s in bitmap7 is N, then bitmap8 with length N can be used to indicate the non-zero coefficients of layer one which is not contained in layer two. Among them, the position of 1 in bitmap8 indicates that the position of the non-zero coefficient belongs to layer one, and the position of 0 indicates that the non-zero coefficient does not belong to layer one. In the same way, bitmap9 with length N can be used to represent the non-zero coefficients of layer one which are not contained in layer two, where the position of 1 in bitmap9 indicates that the position of the non-zero coefficient belongs to layer two, and the position of 0 indicates that the non-zero coefficient does not belong to layer two.

That is, bitmap7 and bitmap8 determine the specific position of the non-zero coefficients of layer one; bitmap7 and bitmap9 determine the position of the non-zero coefficients of layer two. In addition, bitmap7 can be carried in the first part of the CSI, and bitmap8 and bitmap9 can be carried in the second part of the CSI.

Situation 5:

Optionally, the non-zero coefficient indication information includes one or more of the following: the position information of the non-zero coefficients of each layer of the enhanced Type II codebook structure at the same position in the combined coefficient matrix of each layer, the eighth indication information used to indicate whether the coefficient of each layer at the remaining position in the combined coefficient matrix of each layer is zero, and the quantity of non-zero coefficients in each layer at the remaining positions;

The remaining positions are the positions in the combined coefficient matrix other than the same positions.

One specific implementation is as follows:

Specifically, the non-zero coefficient indication information includes: the position information of the non-zero coefficients of each layer of the enhanced Type II codebook structure at the same position in the combined coefficient matrix of each layer, the eighth indication information used to indicate whether the coefficient of each layer at the remaining position in the combined coefficient matrix of each layer is zero, and the number of non-zero coefficients in each layer at the remaining positions; the remaining positions are the positions in the combined coefficient matrix other than the same positions.

Among them, the position information of the non-zero coefficients of each layer at the same position in the combined coefficient matrix of each layer can be represented by a bitmap, and a value of 1 in a bitmap indicates that a non-zero coefficient is at the position. The eighth indication information used to indicate whether the coefficient of each layer at the remaining position in the combined coefficient matrix of each layer is zero can also be represented by a bitmap, and a value of 1 in a certain position in the bitmap which is used to represent the eighth indication information of a certain layer, indicates that a non-zero coefficient is at the position.

Specifically, when the enhanced Type II codebook structure includes two layers, a bitmap10 can be used to indicate the same position of the non-zero coefficients of the two layers. If the number of zeros in bitmap10 is N, then bitmap11 with a length of N can be used to indicate the position of the remaining non-zero coefficients in layer one, and bitmap12 with a length of N can be used to indicate the position of the remaining non-zero coefficients in layer two.

That is, bitmap10 and bitmap11 determine the specific positions of the non-zero coefficients of layer one; bitmap10 and bitmap12 determine the specific positions of the non-zero coefficients of layer two. In addition, bitmap10 can be carried in the first part of the CSI, and bitmap11 and bitmap12 can be carried in the second part of the CSI.

Situation 6:

Optionally, the non-zero coefficient indication information includes one or more of the following: the position information of the first position of the non-zero coefficient of the first layer in the combined coefficient matrix of the first layer, the quantity of the different positions between the second position and the first position, and the position information of the different positions;

among them, the second position is the position of the non-zero coefficients of the second layer in the combined coefficient matrix of the second layer;

the first layer is any layer included in the enhanced Type II codebook structure, and the second layer is any layer included in the enhanced Type II codebook structure except for the first layer.

One specific implementation is as follows:

Specifically, the non-zero coefficient indication information includes: the position information of the first position of the non-zero coefficient of the first layer in the combined coefficient matrix of the first layer, the quantity of the different positions between the second position and the first position, and the position information of the different positions;

Among them, the second position is the position of the non-zero coefficients of the second layer in the combined coefficient matrix of the second layer; the first layer is any layer included in the enhanced Type II codebook structure, and the second layer is any layer included in the enhanced Type II codebook structure except for the first layer.

That is, the terminal can first indicate the specific position of the non-zero coefficients of one of the layers (for example, the first layer), and then indicate the difference between the positions of the non-zero coefficients on the first layer and the other layers (that is, the other layers except the first layer, which can be called the second layer).

Among them, the specific position of the non-zero coefficient of the first layer can be represented by bitmap1' (as shown in Table 1), and a value of 1 in the bitmap indicates that there is a non-zero coefficient in this position. The indication information used to indicate the different positions of the non-zero coefficients between the second layer and the first layer can be represented in the form of a position index. At this time, the terminal needs to report the quantity of different positions of the non-zero coefficients between the second layer and the first layer to the network side. Specifically, when the enhanced Type II codebook structure includes two layers, if the quantity of different positions of the non-zero coefficients between layer one and layer two is 4, are $$\log_2\binom{16}{4} = 11$$

bits are needed to indicate the different positions of the non-zero coefficients between layer one and layer two. Then the network side can obtain the specific position of the non-zero coefficient of layer two according to bitmap1' combined with bitmap13 calculated by 11 bits.

In addition, the indication information used to indicate the different positions of the non-zero coefficients between the second layer and the first layer can also be represented by a bitmap. Then the value of 1 in the bitmap indicates whether the layer has a non-zero coefficient at this position is different from the first layer.

Situation 7

Optionally, the non-zero coefficient indication information includes one or more of the following: the first target position information, the second target position information, and the quantity of non-zero coefficients of each layer included in the target layer;

among them, the target layer includes at least one of the layers of the enhanced Type II codebook structure;

the first target position information is the position information of the non-zero coefficients of each layer included in the target layer in the corresponding combined coefficient matrix;

the second target position information is the position information of the non-zero coefficients of other layers except the layers included in the target layer in the layer of the enhanced Type II codebook structure in the corresponding combined coefficient matrix.

One specific implementation is as follows:

Specifically, the non-zero coefficient indication information includes: first target position information, second target position information, and the quantity of non-zero coefficients of each layer included in the target layer; among them, the target layer includes at least one of the layers of the enhanced Type II codebook structure; the first target position information is the position information of the non-zero coefficients of each layer included in the target layer in the corresponding combined coefficient matrix; the second target position information is the position information of the non-zero coefficients of other layers except the layers included in the target layer in the layer of the enhanced Type II codebook structure in the corresponding combined coefficient matrix.

That is, assuming that the enhanced Type II codebook structure includes layer one and layer two, where layer one contains K1 (less than 2L*M) non-zero coefficients, and layer two contains K2 (less than 2L*M) non-zero coefficients, the number of non-zero coefficients K2 and bitmap1' indicating the non-zero coefficient positions of layer one can be reported respectively in the first part of the CSI, and bitmap2' indicating the non-zero coefficient positions of layer two can be reported respectively in the second part of the CSI, or the positions of the non-zero coefficients of layer two can be represented by $$\log_2\binom{2L*M}{K2}$$

bits using a combination index.

Situation 8

Optionally, the non-zero coefficient indication information includes one or more of the following: the fourth union of the beam sets where the non-zero coefficients of each layer in the enhanced Type II codebook structure are located, and the fifth union of the basis vector sets where the non-zero coefficients of each layer are located, and the ninth indication information used to indicate the positions of the non-zero coefficients of each layer in the fourth union and the fifth unions, and the quantity of non-zero coefficients of each layer.

One specific implementation is as follows:

Specifically, the non-zero coefficient indication information includes: the fourth union of the beam sets where the non-zero coefficients of each layer of the enhanced Type II codebook structure are located, and the fifth union of the basis vector sets where the non-zero coefficients of each layer are located, and the ninth indication information used to indicate the positions of the non-zero coefficients of each layer in the fourth union and the fifth unions, and the quantity of non-zero coefficients of each layer.

That is, assuming that the enhanced Type II codebook structure includes layer one and layer two, where layer one contains K1 (less than 2L*M) non-zero coefficients, and layer two contains K2 (less than 2L*M) non-zero coefficients, the quantity of non-zero coefficients of layer one and layer two (K1 and K2) can be reported respectively in the first part of the CSI, then a bitmap16 can be used to indicate the approximate positions of the non-zero coefficients of the layer one and layer two respectively, and the bitmap16 can be determined by the beam sets and the basis vector sets where the non-zero coefficients are located, specifically, the bitmap16 can be the union of the beams where the non-zero coefficients are located and the union of the base vectors where the non-zero coefficients of the layer one and layer two are located. Then, bitmap18 and bitmap19 are respectively reported in the second part of the CSI to indicate the specific positions of the non-zero coefficients of layer one and layer two.

Optionally, after receiving the non-zero coefficient indication information sent by the terminal, the method further includes:

determining the combined coefficient matrix according to the non-zero coefficient indication information and values of the non-zero coefficients in the combined coefficient matrix obtained in advance.

Among them, the terminal can report the specific value of the non-zero coefficient in the combined coefficient matrix to the network side, but the network side does not know the position of each non-zero coefficient, so it can further determine the specific position according to the received non-zero coefficient indication information, and obtain the combined coefficient matrix.

In addition, according to the determined combined coefficient matrix, and the obtained compressed base vector and orthogonal combined broadband beam, the low-overhead Type II codebook structure defined in NR Rel-16 can be further determined.

The Third Embodiment

As shown in FIG. 4, the embodiment of the present disclosure provides a terminal 400, including:

a first receiving module 401, configured to receive codebook parameter information sent by a network side device;

a codebook structure determination module 402, configured to determine an enhanced Type II codebook structure according to the codebook parameter information;

an indication information determination module 403, configured to determine non-zero coefficient indication information according to the enhanced Type II codebook structure, wherein the non-zero coefficient indication information is used to indicate non-zero coefficient related information in a combined coefficient matrix in the enhanced Type II codebook structure;

a first sending module 404, configured to send the non-zero coefficient indication information to the network side device.

Optionally, the non-zero coefficient indication information includes one or more of the following: position information of the non-zero coefficients of each layer in the combined coefficient matrix of each layer in the enhanced Type II codebook structure, and a quantity of the non-zero coefficients of each layer.

Optionally, the first sending module 404 is specifically used to:

if the non-zero coefficient indication information includes the position information of the non-zero coefficients of each layer in the combined coefficient matrix of each layer of the enhanced Type II codebook structure, the position information of the non-zero coefficients of each layer in the combined coefficient matrix of each layer in the enhanced Type II codebook structure being carried in a first part or a second part of the channel state information and sent to the network side device;

if the non-zero coefficient indication information includes the quantity of non-zero coefficients of each layer, the quantity of non-zero coefficients of each layer being carried in the first part of the channel state information and sent to the network side device.

Optionally, the non-zero coefficient indication information includes one or more of the following: the non-zero coefficient indication information includes one or more of the following: a first beam set and a first basis vector set where the non-zero coefficients of each layer in the enhanced Type II codebook structure are located, first indication information used to indicate positions of non-zero coefficients in the first beam set and the first basis vector set, and a quantity of non-zero coefficients of each layer.

Optionally, the first sending module 404 is specifically used to:

if the non-zero coefficient indication information includes the first beam set and the first basis vector set, the first beam set and the first basis vector set being carried in the first part of the channel state information and sent to the network side device;

if the non-zero coefficient indication information includes the first indication information, the first indication information being carried in the first part or the second part of the channel state information and sent to the network side device;

if the non-zero coefficient indication information includes the quantity of non-zero coefficients of each layer, the quantity of non-zero coefficients of each layer being carried in the first part of the channel state information and sent to the network side device.

Optionally, the non-zero coefficient indication information includes one or more of the following: position information of non-zero coefficients of respective layers of the enhanced Type II codebook structure at a same position in combined coefficient matrix of respective layers, position information of remaining non-zero coefficients of each layer in the combined coefficient matrix of each layer, and a quantity of the remaining non-zero coefficients of each layer;

wherein, the remaining non-zero coefficients are non-zero coefficients at positions other than the same position in the combined coefficient matrix.

Optionally, the first sending module 404 is specifically used to:

if the non-zero coefficient indication information includes the position information of non-zero coefficients at the same position, the position information of non-zero coefficients at the same position being carried in the first part of the channel state information and sent to the network side device;

if the non-zero coefficient indication information includes the position information of the remaining non-zero coefficients of each layer in the combined coefficient matrix of each layer, the position information of the remaining coefficients of each layer in the combined coefficient matrix of each layer being carried in the first part or the second part of the channel state information and sent to the network side device;

if the non-zero coefficient indication information includes the quantity of remaining non-zero coefficients of each layer, the quantity of the remaining non-zero coefficients of each layer being carried in the first part of the channel state information and sent to the network side device.

Optionally, the position information of the remaining non-zero coefficients of each layer in the combined coefficient matrix of each layer includes one or more of the following: a second beam set and a second basis vector set where the remaining non-zero coefficients of each layer are located, and third indication information used to indicate positions of the non-zero coefficients in the second beam set and the second basis vector set.

Optionally, the first sending module 404 is specifically used to:

if the non-zero coefficient indication information includes position information of the same position, the position information of the same position being carried in the first part of the channel state information and sent to the network side device;

if the non-zero coefficient indication information includes the second beam set and the second basis vector set, the second beam set and the second basis vector set being carried in the first part of the channel state information and sent to the network side device;

if the non-zero coefficient indication information includes the third indication information, the third indication information being carried in the first part or the second part of the channel state information and sent to the network side device;

if the non-zero coefficient indication information includes the quantity of the remaining non-zero coefficients of each layer, the quantity of the remaining non-zero coefficients of each layer being carried in the first part of the channel state information and sent to the network side device.

Optionally, the position information of the remaining non-zero coefficients of each layer in the combined coefficient matrix of each layer includes one or more of following: a first union of beam sets where the remaining non-zero coefficients of respective layers are located and a second union of basis vector sets where the remaining non-zero coefficients of respective layers are located, and fifth indication information used to indicate positions of the remaining non-zero coefficients of each layer in the first union and the second union.

Optionally, the first sending module 404 is specifically used to:

if the non-zero coefficient indication information includes the position information of the same position, the position information of the same position being carried in the first part of the channel state information and sent to the network side device;

if the non-zero coefficient indication information includes the first union and the second union, the first union and the second union being carried in the first part of the channel state information and sent to the network side device;

if the non-zero coefficient indication information includes the fifth indication information, the fifth indication information being carried in the first part or the second part of the channel state information and sent to the network side device;

if the non-zero coefficient indication information includes the quantity of the remaining non-zero coefficients of each layer, then the quantity of the remaining non-zero coefficients of each layer being carried in the first part of the channel state information and sent to the network side device.

Optionally, the non-zero coefficient indication information includes one or more of the following: a third union of positions of non-zero coefficients of respective layers in the combined coefficient matrix of respective layers in the enhanced Type II codebook structure, seventh indication information used to indicate whether a coefficient of each layer at the position of the third union is zero, and the quantity of non-zero coefficients of each layer.

Optionally, the first sending module 404 is specifically used to:

if the non-zero coefficient indication information includes the third union, the third union being carried in the first part of the channel state information and sent the network side device;

if the non-zero coefficient indication information includes the seventh indication information, the seventh indication information being carried in the first part or the second part of the channel state information and sent to the network side device;

if the non-zero coefficient indication information includes the quantity of non-zero coefficients of each layer, then the quantity of non-zero coefficients of each layer being carried in the first part of the channel state information and sent to the network side device.

Optionally, the non-zero coefficient indication information includes one or more of the following: the position information of the non-zero coefficients of respective layers at a same position in the combined coefficient matrix of respective layers in the enhanced Type II codebook structure, eighth indication information used to indicate whether a coefficient of each layer at a remaining position in the combined coefficient matrix of each layer is zero, and the quantity of non-zero coefficients in each layer at the remaining positions;

the remaining positions are positions in the combined coefficient matrix other than the same position.

Optionally, the first sending module 404 is specifically used to:

if the non-zero coefficient indication information includes the position information of the same position, the position information of the same position being carried in the first part of the channel state information and sent to the network side device;

if the non-zero coefficient indication information includes the eighth indication information, the eighth indication information being carried in the first part or the second part of the channel state information and sent to the network side device;

if the non-zero coefficient indication information includes the quantity of non-zero coefficients of each layer at the remaining positions, the quantity of non-zero coefficients of each layer at the remaining positions being carried in the first part of the channel state information and sent to the network side device.

Optionally, the non-zero coefficient indication information includes one or more of the following: position information of a first position of non-zero coefficients of a first layer in a combined coefficient matrix of a first layer, a quantity of different positions between the second position and the first position, and position information of the different positions;

wherein, the second position is a position of non-zero coefficients of a second layer in a combined coefficient matrix of a second layer;

the first layer is any layer included in the enhanced Type II codebook structure, and the second layer is any layer included in the enhanced Type II codebook structure other than the first layer.

Optionally, the first sending module 404 is specifically used to:

if the non-zero coefficient indication information includes the position information of the first position, the position information of the first position being carried in the first part of the channel state information and sent to the network side device;

if the non-zero coefficient indication information includes the position information of the different positions, the position information of the different positions being carried in the first part or the second part of the channel state information and sent to the network side device;

if the non-zero coefficient indication information includes the quantity of different positions between the second position and the first position, the quantity of the different positions between the second position and the first position being carried in the first part of the channel state information and sent to the network side device.

Optionally, the non-zero coefficient indication information includes one or more of the following: first target position information, second target position information, and a quantity of non-zero coefficients of each layer included in a target layer;

wherein the target layer includes at least one of layers in the enhanced Type II codebook structure;

the first target position information is position information of non-zero coefficients of each layer included in the target layer in a corresponding combined coefficient matrix;

the second target position information is position information of non-zero coefficients of layers other than a layer included in the target layer in the layers in the enhanced Type II codebook structure in the corresponding combined coefficient matrix.

Optionally, the first sending module 404 is specifically used to:

if the non-zero coefficient indication information includes the first target location information, the first target location information being carried in the second part of the channel state information and sent to the network side device;

if the non-zero coefficient indication information includes the second target location information, the second target location information being carried in the first part of the channel state information and sent to the network side device;

if the non-zero coefficient indication information includes the quantity of non-zero coefficients of each layer included in the target layer, then the quantity of non-zero coefficients of each layer included in the target layer being carried in the first part of the channel state information and sent to the network side device.

Optionally, the non-zero coefficient indication information includes one or more of the following: the non-zero coefficient indication information includes one or more of the following: a fourth union of beam sets where the non-zero coefficients of each layer in the enhanced Type II codebook structure are located, and a fifth union of basis vector sets where the non-zero coefficients of each layer are located, and ninth indication information used to indicate positions of the non-zero coefficients of each layer in the fourth union and the fifth unions, and the quantity of non-zero coefficients of each layer.

Optionally, the first sending module 404 is specifically used to achieve:

if the non-zero coefficient indication information includes the fourth union and the fifth union, the fourth union and the fifth union being carried in the first part of the channel state information and sent to the network side device;

if the non-zero coefficient indication information includes the ninth indication information, the ninth indication information being carried in the first part or the second part of the channel state information and sent to the network side device;

if the non-zero coefficient indication information includes the quantity of non-zero coefficients in each layer, the number of non-zero coefficients in each layer being carried in the first part of the channel state information and sent to the network side device.

The Fourth Embodiment

Figure 5:
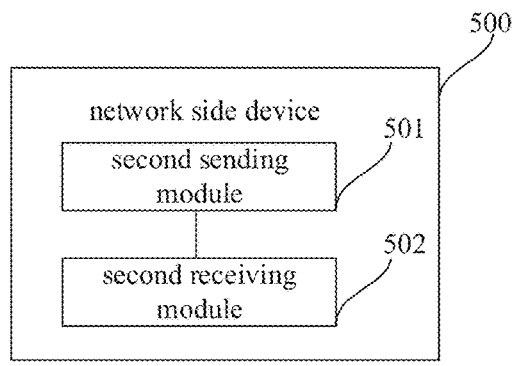
FIG. 5 illustrates a schematic module diagram of a network side device according to a fourth embodiment of the present disclosure.

As shown in FIG. 5, the embodiment of the present disclosure provides a network side device 500, including:

a second sending module 501, configured to send codebook parameter information to a terminal;

a second receiving module 502, configured to receive non-zero coefficient indication information sent by the terminal, wherein the non-zero coefficient indication information is used to indicate the relevant information of the non-zero coefficients in a combined coefficient matrix in an enhanced Type II codebook structure, the enhanced Type II codebook structure is determined according to the codebook parameter information.

Optionally, the non-zero coefficient indication information includes one or more of the following: position information of the non-zero coefficients of each layer in the combined coefficient matrix of each layer in the enhanced Type II codebook structure, and the quantity of the non-zero coefficients of each layer;

or the non-zero coefficient indication information includes one or more of the following: a first beam set and a first basis vector set where the non-zero coefficients of each layer in the enhanced Type II codebook structure are located, first indication information used to indicate positions of non-zero coefficients in the first beam set and the first basis vector set, and a quantity of non-zero coefficients of each layer;

or the non-zero coefficient indication information includes one or more of the following: a third union of positions of non-zero coefficients of respective layers in the combined coefficient matrix of respective layers in the enhanced Type II codebook structure, seventh indication information used to indicate whether a coefficient of each layer at the position of the third union is zero, and the quantity of non-zero coefficients of each layer;

or the non-zero coefficient indication information includes one or more of the following:

the position information of the non-zero coefficients of respective layers at a same position in the combined coefficient matrix of respective layers in the enhanced Type II codebook structure, eighth indication information used to indicate whether the coefficient of each layer at the remaining position in the combined coefficient matrix of each layer is zero, and the quantity of non-zero coefficients in each layer at the remaining positions; the remaining positions are positions in the combined coefficient matrix other than the same positions;

or the non-zero coefficient indication information includes one or more of the following:

position information of a first position of non-zero coefficients of a first layer in a combined coefficient matrix of the first layer, a quantity of different positions between the second position and the first position, and position information of the different positions; wherein, the second position is a position of non-zero coefficients of a second layer in a combined coefficient matrix of a second layer; the first layer is any layer included in the enhanced Type II codebook structure, and the second layer is any layer included in the enhanced Type II codebook structure other than the first layer;

or the non-zero coefficient indication information includes one or more of the following:

first target position information, second target position information, and a quantity of non-zero coefficients of each layer included in a target layer; wherein the target layer includes at least one of layers in the enhanced Type II codebook structure; the first target position information is position information of the non-zero coefficients of each layer included in the target layer in a corresponding combined coefficient matrix; the second target position information is position information of the non-zero coefficients of layers other than the layer included in the target layer in the layer of the enhanced Type II codebook structure in the corresponding combined coefficient matrix;

or the non-zero coefficient indication information includes one or more of the following: a fourth union of beam sets where the non-zero coefficients of each layer in the enhanced Type II codebook structure are located, and a fifth union of basis vector sets where the non-zero coefficients of each layer are located, and ninth indication information used to indicate positions of the non-zero coefficients of each layer in the fourth union and the fifth unions, and the quantity of non-zero coefficients of each layer.

Optionally, the non-zero coefficient indication information includes one or more of the following: position information of non-zero coefficients of respective layers of the enhanced Type II codebook structure at a same position in combined coefficient matrix of respective layers, position information of the remaining non-zero coefficients of each layer in the combined coefficient matrix of each layer, and a quantity of the remaining non-zero coefficients of each layer; the remaining non-zero coefficients are non-zero coefficients at positions other than the same position in the combined coefficient matrix.

Optionally, the position information of the remaining non-zero coefficients of each layer in the combined coefficient matrix of each layer includes one or more of the following: a second beam set and a second basis vector set where the remaining non-zero coefficients of each layer are located, and third indication information used to indicate the positions of the non-zero coefficients in the second beam set and the second basis vector set.

Optionally, the position information of the remaining non-zero coefficients of each layer in the combined coefficient matrix of each layer includes one or more of following: a first union of beam sets where the remaining non-zero coefficients of respective layers are located and a second union of basis vector sets where the remaining non-zero coefficients of respective layers are located, and fifth indication information used to indicate the positions of the remaining non-zero coefficients of each layer in the first union and the second union.

Optionally, the network side device 500 further includes:

a matrix determination module, configured to determine the combined coefficient matrix according to the non-zero coefficient indication information and values of the non-zero coefficients in the combined coefficient matrix obtained in advance.

The Fifth Embodiment

Figure 6:
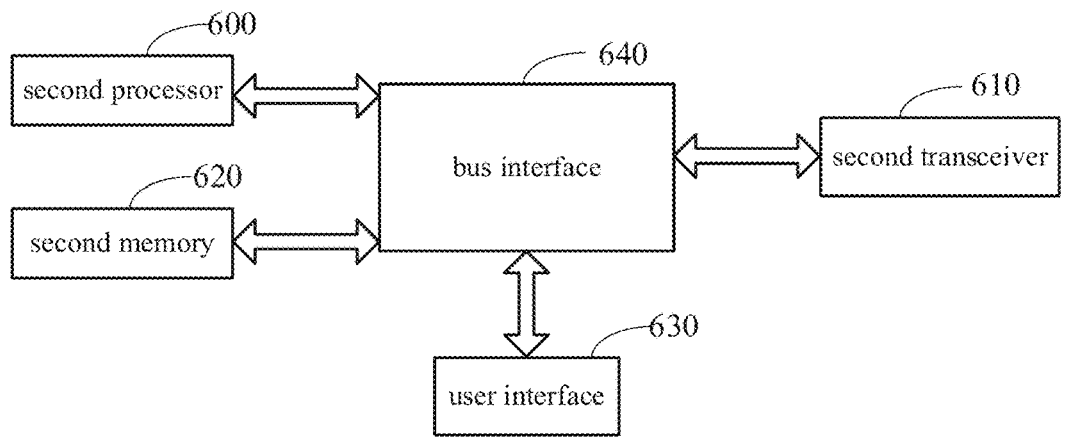
FIG. 6 illustrates a structural block diagram of a terminal according to a fifth embodiment of the present disclosure.

In order to better achieve the above objective, as shown in FIG. 6, this embodiment provides a terminal, including:

a first processor 600; and a first memory 620 connected to the first processor 600 through a bus interface 640, the first memory 620 is used to store programs and data used by the first processor 600 when performing operations, when the first processor 600 calls and executes the programs and data stored in the first memory 620, the following process is performed.

Among them, the first transceiver 610 is connected to the bus interface 640, and is used to receive and send data under the control of the second processor 600, specifically:

the first transceiver 610 is used to: receive codebook parameter information sent by the network side device;

the first processor 600 is used to: determine an enhanced Type II codebook structure according to the codebook parameter information; determine non-zero coefficient indication information according to the enhanced Type II codebook structure, wherein the non-zero coefficient indication information is used to indicate non-zero coefficient related information in a combined coefficient matrix in the enhanced Type II codebook structure;

the first transceiver 610 is also used to: send the non-zero coefficient indication information to the network side device.

Optionally, the non-zero coefficient indication information includes one or more of the following: position information of the non-zero coefficients of each layer in the combined coefficient matrix of each layer in the enhanced Type II codebook structure, and a quantity of the non-zero coefficients of each layer.

Optionally, when the first transceiver 610 sends the non-zero coefficient indication information to the network side, it is specifically used to implement the following:

if the non-zero coefficient indication information includes the position information of the non-zero coefficients of each layer in the combined coefficient matrix of each layer of the enhanced Type II codebook structure, the position information of the non-zero coefficients of each layer in the combined coefficient matrix of each layer in the enhanced Type II codebook structure being carried in a first part or a second part of the channel state information and sent to the network side device;

if the non-zero coefficient indication information includes the quantity of non-zero coefficients of each layer, the quantity of non-zero coefficients of each layer being carried in the first part of the channel state information and sent to the network side device.

Optionally, the non-zero coefficient indication information includes one or more of the following: a first beam set and a first basis vector set where the non-zero coefficients of each layer in the enhanced Type II codebook structure are located, first indication information used to indicate positions of non-zero coefficients in the first beam set and the first basis vector set, and a quantity of non-zero coefficients of each layer.

Optionally, when the first transceiver 610 sends the non-zero coefficient indication information to the network side, it is specifically used to implement the followings:

if the non-zero coefficient indication information includes the first beam set and the first basis vector set, the first beam set and the first basis vector set being carried in the first part of the channel state information and sent to the network side device;

if the non-zero coefficient indication information includes the first indication information, the first indication information being carried in the first part or the second part of the channel state information and sent to the network side device;

if the non-zero coefficient indication information includes the quantity of non-zero coefficients of each layer, the quantity of non-zero coefficients of each layer being carried in the first part of the channel state information and sent to the network side device.

Optionally, the non-zero coefficient indication information includes one or more of the following: position information of non-zero coefficients of respective layers of the enhanced Type II codebook structure at a same position in combined coefficient matrix of respective layers, position information of remaining non-zero coefficients of each layer in the combined coefficient matrix of each layer, and a quantity of the remaining non-zero coefficients of each layer;

wherein, the remaining non-zero coefficients are non-zero coefficients at positions other than the same position in the combined coefficient matrix.

Optionally, when the first transceiver 610 sends the non-zero coefficient indication information to the network side, it is specifically used to implement the followings:

if the non-zero coefficient indication information includes the position information of non-zero coefficients at the same position, the position information of non-zero coefficients at the same position being carried in the first part of the channel state information and sent to the network side device;

if the non-zero coefficient indication information includes the position information of the remaining non-zero coefficients of each layer in the combined coefficient matrix of each layer, the position information of the remaining coefficients of each layer in the combined coefficient matrix of each layer being carried in the first part or the second part of the channel state information and sent to the network side device;

if the non-zero coefficient indication information includes the quantity of remaining non-zero coefficients of each layer, the quantity of the remaining non-zero coefficients of each layer being carried in the first part of the channel state information and sent to the network side device.

Optionally, the position information of the remaining non-zero coefficients of each layer in the combined coefficient matrix of each layer includes one or more of the following: a second beam set and a second basis vector set where the remaining non-zero coefficients of each layer are located, and third indication information used to indicate positions of the non-zero coefficients in the second beam set and the second basis vector set.

Optionally, when the first transceiver 610 sends the non-zero coefficient indication information to the network side, it is specifically used to implement the followings:

if the non-zero coefficient indication information includes position information of the same position, the position information of the same position being carried in the first part of the channel state information and sent to the network side device;

if the non-zero coefficient indication information includes the second beam set and the second basis vector set, the second beam set and the second basis vector set being carried in the first part of the channel state information and sent to the network side device;

if the non-zero coefficient indication information includes the third indication information, the third indication information being carried in the first part or the second part of the channel state information and sent to the network side device;

if the non-zero coefficient indication information includes the quantity of the remaining non-zero coefficients of each layer, the quantity of the remaining non-zero coefficients of each layer being carried in the first part of the channel state information and sent to the network side device.

Optionally, the position information of the remaining non-zero coefficients of each layer in the combined coefficient matrix of each layer includes one or more of following: a first union of beam sets where the remaining non-zero coefficients of respective layers are located and a second union of basis vector sets where the remaining non-zero coefficients of respective layers are located, and fifth indication information used to indicate positions of the remaining non-zero coefficients of each layer in the first union and the second union.

Optionally, when the first transceiver 610 sends the non-zero coefficient indication information to the network side, it is specifically used to implement the followings:

if the non-zero coefficient indication information includes the position information of the same position, the position information of the same position being carried in the first part of the channel state information and sent to the network side device;

if the non-zero coefficient indication information includes the first union and the second union, the first union and the second union being carried in the first part of the channel state information and sent to the network side device;

if the non-zero coefficient indication information includes the fifth indication information, the fifth indication information being carried in the first part or the second part of the channel state information and sent to the network side device;

if the non-zero coefficient indication information includes the quantity of the remaining non-zero coefficients of each layer, then the quantity of the remaining non-zero coefficients of each layer being carried in the first part of the channel state information and sent to the network side device.

Optionally, the non-zero coefficient indication information includes one or more of the following: a third union of positions of non-zero coefficients of respective layers in the combined coefficient matrix of respective layers in the enhanced Type II codebook structure, seventh indication information used to indicate whether a coefficient of each layer at the position of the third union is zero, and the quantity of non-zero coefficients of each layer.

Optionally, when the first transceiver 610 sends the non-zero coefficient indication information to the network side, it is specifically used to implement the followings:

if the non-zero coefficient indication information includes the third union, the third union being carried in the first part of the channel state information and sent the network side device;

if the non-zero coefficient indication information includes the seventh indication information, the seventh indication information being carried in the first part or the second part of the channel state information and sent to the network side device;

if the non-zero coefficient indication information includes the quantity of non-zero coefficients of each layer, then the quantity of non-zero coefficients of each layer being carried in the first part of the channel state information and sent to the network side device.

Optionally, the non-zero coefficient indication information includes one or more of the following: the position information of the non-zero coefficients of respective layers at a same position in the combined coefficient matrix of respective layers in the enhanced Type II codebook structure, eighth indication information used to indicate whether a coefficient of each layer at a remaining position in the combined coefficient matrix of each layer is zero, and the quantity of non-zero coefficients in each layer at the remaining positions;

the remaining positions are positions in the combined coefficient matrix other than the same position.

Optionally, when the first transceiver 610 sends the non-zero coefficient indication information to the network side, it is specifically used to implement the followings:

if the non-zero coefficient indication information includes the position information of the same position, the position information of the same position being carried in the first part of the channel state information and sent to the network side device;

if the non-zero coefficient indication information includes the eighth indication information, the eighth indication information being carried in the first part or the second part of the channel state information and sent to the network side device;

if the non-zero coefficient indication information includes the quantity of non-zero coefficients of each layer at the remaining positions, the quantity of non-zero coefficients of each layer at the remaining positions being carried in the first part of the channel state information and sent to the network side device.

Optionally, the non-zero coefficient indication information includes one or more of the following: position information of a first position of non-zero coefficients of a first layer in a combined coefficient matrix of a first layer, a quantity of different positions between the second position and the first position, and position information of the different positions;

wherein, the second position is a position of non-zero coefficients of a second layer in a combined coefficient matrix of a second layer;

the first layer is any layer included in the enhanced Type II codebook structure, and the second layer is any layer included in the enhanced Type II codebook structure other than the first layer.

Optionally, when the first transceiver 610 sends the non-zero coefficient indication information to the network side, it is specifically used to implement the followings:

if the non-zero coefficient indication information includes the position information of the first position, the position information of the first position being carried in the first part of the channel state information and sent to the network side device;

if the non-zero coefficient indication information includes the position information of the different positions, the position information of the different positions being carried in the first part or the second part of the channel state information and sent to the network side device;

if the non-zero coefficient indication information includes the quantity of different positions between the second position and the first position, the quantity of the different positions between the second position and the first position being carried in the first part of the channel state information and sent to the network side device.

Optionally, the non-zero coefficient indication information includes one or more of the following: first target position information, second target position information, and a quantity of non-zero coefficients of each layer included in a target layer;

wherein the target layer includes at least one of layers in the enhanced Type II codebook structure;

the first target position information is position information of non-zero coefficients of each layer included in the target layer in a corresponding combined coefficient matrix;

the second target position information is position information of non-zero coefficients of layers other than a layer included in the target layer in the layers in the enhanced Type II codebook structure in the corresponding combined coefficient matrix.

Optionally, when the first transceiver 610 sends the non-zero coefficient indication information to the network side, it is specifically used to implement the followings:

if the non-zero coefficient indication information includes the first target location information, the first target location information being carried in the second part of the channel state information and sent to the network side device;

if the non-zero coefficient indication information includes the second target location information, the second target location information being carried in the first part of the channel state information and sent to the network side device;

if the non-zero coefficient indication information includes the quantity of non-zero coefficients of each layer included in the target layer, then the quantity of non-zero coefficients of each layer included in the target layer being carried in the first part of the channel state information and sent to the network side device.

Optionally, the non-zero coefficient indication information includes one or more of the following: a fourth union of beam sets where the non-zero coefficients of each layer in the enhanced Type II codebook structure are located, and a fifth union of basis vector sets where the non-zero coefficients of each layer are located, and ninth indication information used to indicate positions of the non-zero coefficients of each layer in the fourth union and the fifth unions, and the quantity of non-zero coefficients of each layer.

Optionally, when the first transceiver 610 sends the non-zero coefficient indication information to the network side, it is specifically used to implement the followings:

if the non-zero coefficient indication information includes the fourth union and the fifth union, the fourth union and the fifth union being carried in the first part of the channel state information and sent to the network side device;

if the non-zero coefficient indication information includes the ninth indication information, the ninth indication information being carried in the first part or the second part of the channel state information and sent to the network side device;

if the non-zero coefficient indication information includes the quantity of non-zero coefficients in each layer, the number of non-zero coefficients in each layer being carried in the first part of the channel state information and sent to the network side device.

It should be noted that in FIG. 6, the bus architecture may include any number of interconnected buses and bridges, specifically various circuits of one or more processors represented by the first processor 600 and the memory represented by the first memory 620 are connected together. The bus architecture can also connect various other circuits such as peripheral devices, voltage regulators, power management circuits, etc., which are all known in the field, and therefore, will not be further described herein. The bus interface provides the interface. The first transceiver 610 may be a plurality of elements, that is, including a transmitter and a receiver, and provide a unit for communicating with various other devices on the transmission medium. For different terminals, the user interface 630 may also be an interface capable of connecting externally and internally with required device. The connected device includes but is not limited to a keypad, a display, a speaker, a microphone, a joystick, etc. The first processor 600 is responsible for managing the bus architecture and general processing, and the first memory 620 can store data used by the first processor 600 when performing operations.

A person skilled in the art can understand that all or part of the steps in the above-mentioned embodiments can be implemented by hardware, or by a computer program to instruct relevant hardware. The computer program includes instructions for performing parts or all of the steps of the above-mentioned method; and the computer program can be stored in a readable storage medium, and the storage medium can be any form of storage medium.

The Sixth Embodiment

Figure 7:
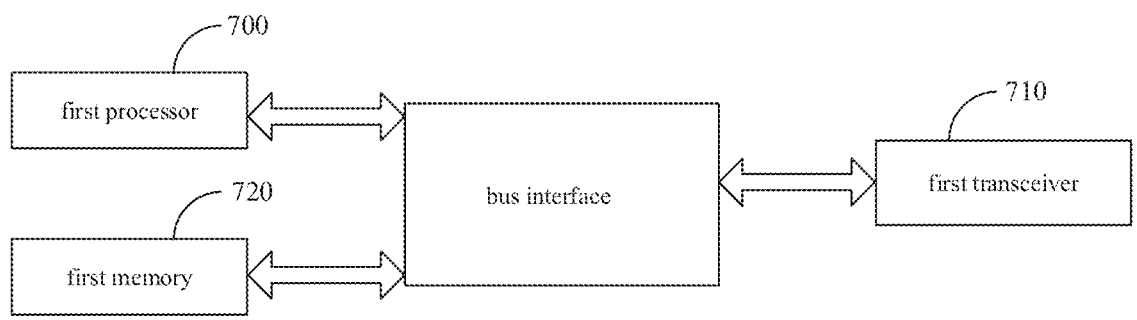
FIG. 7 illustrates a structural block diagram of a network side device according to a sixth embodiment of the present disclosure.

In order to better achieve the above objective, as shown in FIG. 7, this embodiment provides a base station, including: a second processor 700; a second memory 720 connected to the second processor 700 through a bus interface, and a second transceiver 710 connected to the second processor 700 through a bus interface; the second memory 720 is used to store programs and data used by the second processor 700 when performing operations; the second transceiver 710 sends data information or pilots, and also receives an uplink control channel; when the second processor 700 calls and executes the programs and data stored in the first memory 620, the second transceiver 710 is used to: send codebook parameter information to a terminal; receive non-zero coefficient indication information sent by the terminal, wherein the non-zero coefficient indication information is used to indicate the relevant information of the non-zero coefficients in a combined coefficient matrix in an enhanced Type II codebook structure, the enhanced Type II codebook structure is determined according to the codebook parameter information.

Optionally, the non-zero coefficient indication information includes one or more of the following: position information of the non-zero coefficients of each layer in the combined coefficient matrix of each layer in the enhanced Type II codebook structure, and the number of the non-zero coefficients of each layer;

or the non-zero coefficient indication information includes one or more of the following: a first beam set and a first basis vector set where the non-zero coefficients of each layer in the enhanced Type II codebook structure are located, first indication information used to indicate positions of non-zero coefficients in the first beam set and the first basis vector set, and a quantity of non-zero coefficients of each layer;

or the non-zero coefficient indication information includes one or more of the following: a third union of positions of non-zero coefficients of respective layers in the combined coefficient matrix of respective layers in the enhanced Type II codebook structure, seventh indication information used to indicate whether a coefficient of each layer at the position of the third union is zero, and the quantity of non-zero coefficients of each layer;

or the non-zero coefficient indication information includes one or more of the following:

the position information of the non-zero coefficients of respective layers at a same position in the combined coefficient matrix of respective layers in the enhanced Type II codebook structure, eighth indication information used to indicate whether the coefficient of each layer at the remaining position in the combined coefficient matrix of each layer is zero, and the quantity of non-zero coefficients in each layer at the remaining positions; the remaining positions are positions in the combined coefficient matrix other than the same positions;

or the non-zero coefficient indication information includes one or more of the following:

position information of a first position of non-zero coefficients of a first layer in a combined coefficient matrix of the first layer, a quantity of different positions between the second position and the first position, and position information of the different positions; wherein, the second position is a position of non-zero coefficients of a second layer in a combined coefficient matrix of a second layer; the first layer is any layer included in the enhanced Type II codebook structure, and the second layer is any layer included in the enhanced Type II codebook structure other than the first layer;

or the non-zero coefficient indication information includes one or more of the following:

first target position information, second target position information, and a quantity of non-zero coefficients of each layer included in a target layer; wherein the target layer includes at least one of layers in the enhanced Type II codebook structure; the first target position information is position information of the non-zero coefficients of each layer included in the target layer in a corresponding combined coefficient matrix; the second target position information is position information of the non-zero coefficients of layers other than the layer included in the target layer in the layer of the enhanced Type II codebook structure in the corresponding combined coefficient matrix;

or the non-zero coefficient indication information includes one or more of the following: a fourth union of beam sets where the non-zero coefficients of each layer in the enhanced Type II codebook structure are located, and a fifth union of basis vector sets where the non-zero coefficients of each layer are located, and ninth indication information used to indicate positions of the non-zero coefficients of each layer in the fourth union and the fifth unions, and the quantity of non-zero coefficients of each layer.

Optionally, the non-zero coefficient indication information includes one or more of the following: position information of non-zero coefficients of respective layers of the enhanced Type II codebook structure at a same position in combined coefficient matrix of respective layers, position information of the remaining non-zero coefficients of each layer in the combined coefficient matrix of each layer, and a quantity of the remaining non-zero coefficients of each layer; the remaining non-zero coefficients are non-zero coefficients at positions other than the same position in the combined coefficient matrix.

Optionally, the position information of the remaining non-zero coefficients of each layer in the combined coefficient matrix of each layer includes one or more of the following: a second beam set and a second basis vector set where the remaining non-zero coefficients of each layer are located, and third indication information used to indicate the positions of the non-zero coefficients in the second beam set and the second basis vector set.

Optionally, the position information of the remaining non-zero coefficients of each layer in the combined coefficient matrix of each layer includes one or more of following: a first union of beam sets where the remaining non-zero coefficients of respective layers are located and a second union of basis vector sets where the remaining non-zero coefficients of respective layers are located, and fifth indication information used to indicate the positions of the remaining non-zero coefficients of each layer in the first union and the second union.

Optionally, the second processor is used to: determine the combined coefficient matrix according to the non-zero coefficient indication information and values of the non-zero coefficients in the combined coefficient matrix obtained in advance.

Among them, in FIG. 7, the bus architecture may include any number of interconnected buses and bridges, specifically, various circuits of one or more processors represented by the second processor 700 and the memory represented by the second memory 720 are connected together. The bus architecture can also connect various other circuits such as peripheral devices, voltage regulators, power management circuits, etc., which are all known in the field, and therefore, no further descriptions are provided herein. The bus interface provides the interface. The second transceiver 710 may be a plurality of elements, including a transmitter and a transceiver, and provides a unit for communicating with various other devices on the transmission medium. The second processor 700 is responsible for managing the bus architecture and general processing, and the second memory 720 can store the data used by the second processor 700 when performing operations.

A person skilled in the art can understand that all or part of the steps of the above-mentioned embodiments can be implemented by hardware, or can also be implemented by instructing the relevant hardware through a computer program.

The computer program includes instructions for performing part or all of the steps of the above-mentioned method; and the computer program can be stored in a readable storage medium, and the storage medium can be any form of storage medium.

In addition, it should be pointed out that in the device and method of the present disclosure, obviously, each component or each step can be decomposed and/or recombined. This decomposition and/or recombination should be regarded as equivalent solutions of the present disclosure. In addition, the steps of performing the above series of processing can naturally be performed in a chronological order in description, but do not necessarily need to be performed in the chronological order, and some steps can be performed in parallel or independently of each other. The person skilled in the art can understand that all or any of the steps or components of the method and device of the present disclosure can be used in any computing device (including a processor, storage medium, etc.) or a network of computing devices, and implemented by hardware, firmware, software, or any combination thereof. This can be achieved by the person skilled in the art using their basic programming skills after reading the description of the present disclosure.

Therefore, the purpose of the present disclosure can also be realized by running a program or a group of programs on any computing device. The computing device may be a well-known general-purpose device. Therefore, the purpose of the present disclosure can also be achieved only by providing a program product containing program code for implementing the method or device of the present disclosure. That is, such a program product also constitutes the present disclosure, and a storage medium storing such a program product also constitutes the present disclosure. Obviously, the storage medium may be any well-known storage medium, or any storage medium developed in the future. It should also be pointed out that in the device and method of the present disclosure, obviously, each component or each step can be decomposed and/or recombined. This decomposition and/or recombination should be regarded as equivalent solutions of the present disclosure. In addition, the steps of executing the above-mentioned series of processing can naturally be executed in a chronological order in the description, but it is not necessarily executed in the chronological order. Some steps can be performed in parallel or independently of each other.

The person skilled in the art may realize that the units and algorithm steps described in the embodiments disclosed herein can be implemented by electronic hardware or a combination of computer software and electronic hardware. Whether these functions are executed by hardware or software depends on the specific application and design constraint conditions of the technical solution. The person skilled in the art can use different methods for each specific application to implement the described functions, but such implementation should not be considered as going beyond the scope of the present disclosure.

The person skilled in the art can clearly understand that, for the convenience and conciseness of the description, the specific working process of the system, device, and unit described above can refer to the corresponding process in the foregoing method embodiments, which is not repeated here.

In the embodiments provided in the present disclosure, it should be understood that the disclosed device and method may be implemented in other ways. For example, the device embodiments described above are only illustrative, for example, the division of the units is only a logical function division, and there may be other type of divisions in actual implementation, for example, multiple units or components may be combined or it can be integrated into another system, or some features can be ignored or not implemented. In addition, the displayed or discussed mutual coupling or direct coupling or communication connection may be indirect coupling or communication connection through some interfaces, devices, or units, and maybe in electrical, mechanical, or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or each unit may exist alone physically, or two or more units may be integrated into one unit.

If the function is implemented in the form of a software functional unit and sold or used as an independent product, it can be stored in a computer readable storage medium. Based on this understanding, the technical solution of the present disclosure essentially or the part that contributes to the related art can be embodied in the form of a software product. The computer software product is stored in a storage medium and includes several instructions to make a computer device (which may be a personal computer, a server, or a network device, etc.) executes all or part of the steps of the methods described in the various embodiments of the present disclosure. The aforementioned storage media include: U disk, mobile hard disk, ROM, RAM, magnetic disk or optical disk, and other media that can store program codes.

The person skilled in the art can understand that all or part of the processes in the above-mentioned embodiment methods can be implemented by controlling the relevant hardware through a computer program. The program can be stored in a computer readable storage medium, and the program can be stored in a computer readable storage medium. When executed, it may include the procedures of the above-mentioned method embodiments. Among them, the storage medium may be a magnetic disk, an optical disk, a read-only memory (ROM), or a random access memory (RAM), etc.

It can be understood that the embodiments described in the present disclosure may be implemented by hardware, software, firmware, middleware, microcode, or a combination of them. For hardware implementation, the processing unit can be implemented in one or more application-specific integrated circuits (ASIC), digital signal processor (DSP), digital signal processing device (DSP Device, DSPD), programmable logic device (PLD), Field-Programmable Gate Array (FPGA), general-purpose processors, controllers, microcontrollers, microprocessors, and others for performing the functions described in this disclosure electronic unit or the combination thereof.

For a software implementation, the technology described in the embodiments of the present disclosure can be implemented by modules (for example, procedures, functions, etc.) that perform the functions described in the embodiments of the present disclosure. The software codes can be stored in the memory and executed by the processor. The memory can be implemented in the processor or external to the processor.

The above are optional implementations of the present disclosure. It should be pointed out that for a person skilled in the art, several improvements and modifications can be made without departing from the principles of the present disclosure. These improvements and modifications should also fall within the protection scope of the present disclosure.

What is claimed is:

1. A channel state information reporting method, comprising:
receiving codebook parameter information sent by a network side device;
determining an enhanced Type II codebook structure according to the codebook parameter information;
determining non-zero coefficient indication information according to the enhanced Type II codebook structure, wherein the non-zero coefficient indication information is used to indicate non-zero coefficient related information in a combined coefficient matrix in the enhanced Type II codebook structure;
sending the non-zero coefficient indication information to the network side device;
wherein the non-zero coefficient indication information comprises one or more of the following: a first beam set and a first basis vector set where the non-zero coefficients of each layer in the enhanced Type II codebook structure are located, first indication information used to indicate positions of beams of the first beam set among all beams and positions of basis vectors of the first basis vector set among all basis vectors;
wherein sending the non-zero coefficient indication information to the network side device comprises:
if the non-zero coefficient indication information comprises the first beam set and the first basis vector set, the first beam set and the first basis vector set being carried in the first part of the channel state information and sent to the network side device;
if the non-zero coefficient indication information comprises the first indication information, the first indication information being carried in the first part or the second part of the channel state information and sent to the network side device.

2. A non-transitory computer readable storage medium with a computer program stored thereon, when executed by a processor, the computer program implement the channel state information reporting method according to claim 1.

3. The channel state information reporting method according to claim 1, wherein the non-zero coefficient indication information further comprises a quantity of non-zero coefficients of each layer; and
the method further comprises the quantity of non-zero coefficients of each layer being carried in the first part of the channel state information and sent to the network side device.

4. A channel state information receiving method, comprising:
sending codebook parameter information to a terminal;
receiving non-zero coefficient indication information sent by the terminal, wherein the non-zero coefficient indication information is used to indicate non-zero coefficient related information in a combined coefficient matrix in an enhanced Type II codebook structure, the enhanced Type II codebook structure is determined by the terminal according to the codebook parameter information;
wherein the non-zero coefficient indication information comprises one or more of the following: a first beam set and a first basis vector set where the non-zero coefficients of each layer in the enhanced Type II codebook structure are located, first indication information used to indicate positions of beams of the first beam set among all beams and positions of basis vectors of the first basis vector set among all basis vectors;
wherein receiving the non-zero coefficient indication information sent by the terminal comprises:
if the non-zero coefficient indication information comprises the first beam set and the first basis vector set, receiving the first beam set and the first basis vector set being carried in the first part of the channel state information sent by the terminal;

if the non-zero coefficient indication information comprises the first indication information, receiving the first indication information being carried in the first part or the second part of the channel state information sent by the terminal.

5. A network side device comprising a second transceiver, a second memory, a second processor, and a program stored on the second memory and executed by the second processor; wherein, the second transceiver is used to implement the channel state information receiving method according to claim 4.

6. The network side device according to claim 5, wherein the non-zero coefficient indication information further comprises a quantity of non-zero coefficients of each layer; and the second transceiver is further used to implement the following: receiving the quantity of non-zero coefficients of each layer being carried in the first part of the channel state information sent by the terminal.

7. A non-transitory computer readable storage medium with a computer program stored thereon, when executed by a processor, the computer program implement the channel state information receiving method according to claim 4.

8. The channel state information receiving method according to claim 4, wherein the non-zero coefficient indication information further comprises a quantity of non-zero coefficients of each layer; and the method further comprises receiving the quantity of non-zero coefficients of each layer being carried in the first part of the channel state information sent by the terminal.

9. A terminal comprising a first transceiver, a first memory, a first processor, and a program stored on the first memory and executed by the first processor; wherein:

the first transceiver is used to: receive codebook parameter information sent by a network side device;

the first processor is used to: determine an enhanced Type II codebook structure according to the codebook parameter information; determine non-zero coefficient indication information according to the enhanced Type II codebook structure, wherein the non-zero coefficient indication information is used to indicate non-zero coefficient related information in a combined coefficient matrix in the enhanced Type II codebook structure;

the first transceiver is further used to: send the non-zero coefficient indication information to the network side device;

wherein the non-zero coefficient indication information comprises one or more of the following: a first beam set and a first basis vector set where the non-zero coefficients of each layer in the enhanced Type II codebook structure are located, first indication information used to indicate positions of beams of the first beam set among all beams and positions of basis vectors of the first basis vector set among all basis vectors;

wherein the first transceiver is further used to implement the following:

if the non-zero coefficient indication information comprises the first beam set and the first basis vector set, the first beam set and the first basis vector set being carried in the first part of the channel state information and sent to the network side device;

if the non-zero coefficient indication information comprises the first indication information, the first indication information being carried in the first part or the second part of the channel state information and sent to the network side device.

10. The terminal according to claim 9, wherein the non-zero coefficient indication information further comprises a quantity of non-zero coefficients of each layer; and the first transceiver is further used to implement the following: the quantity of non-zero coefficients of each layer being carried in the first part of the channel state information and sent to the network side device.

\* \* \* \* \*